US007103647B2

(12) United States Patent
Aziz

(10) Patent No.: US 7,103,647 B2
(45) **Date of Patent: *Sep. 5, 2006**

(54) SYMBOLIC DEFINITION OF A COMPUTER SYSTEM

(75) Inventor: Ashar Aziz, Fremont, CA (US)

(73) Assignee: Terraspring, Inc., Fremont, CA (US)

( * ) Notice: Subject to any disclaimer, the term of this patent is extended or adjusted under 35 U.S.C. 154(b) by 1206 days.

This patent is subject to a terminal disclaimer.

(21) Appl. No.: 09/818,424

(22) Filed: Mar. 26, 2001

(65) Prior Publication Data

US 2003/0154279 A1 Aug. 14, 2003

Related U.S. Application Data

(63) Continuation-in-part of application No. 09/502,170, filed on Feb. 11, 2000.

(60) Provisional application No. 60/212,925, filed on Jun. 19, 2000, and provisional application No. 60/150,394, filed on Aug. 23, 1999.

(51) Int. Cl.
*G06F 15/177* (2006.01)

(52) U.S. Cl. ........................ 709/220; 709/221; 715/513

(58) Field of Classification Search ................. 709/220, 709/221, 223, 224; 715/513
See application file for complete search history.

(56) References Cited

U.S. PATENT DOCUMENTS

| | | | |
|---|---|---|---|
| 4,591,967 A | 5/1986 | Mattes et al. | |
| 5,163,130 A | 11/1992 | Hullot | 395/148 |
| 5,504,670 A | 4/1996 | Barth et al. | |
| 5,574,914 A | 11/1996 | Hancock et al. | |

(Continued)

FOREIGN PATENT DOCUMENTS

| | | |
|---|---|---|
| EP | 0 262 750 A2 | 4/1988 |
| EP | 0 490 624 A2 | 6/1992 |
| EP | 0 750 256 A2 | 12/1996 |
| EP | 0 791 881 A1 | 8/1997 |
| EP | 0 905 621 A1 | 3/1999 |
| EP | 0917056 A2 | 5/1999 |
| EP | 0 917 056 A2 | 5/1999 |
| EP | 0935200 A1 | 8/1999 |
| WO | WO 97/49214 A1 | 12/1997 |
| WO | WO 99/57957 A2 | 11/1999 |
| WO | WO 00/29954 A1 | 5/2000 |

OTHER PUBLICATIONS

Microsoft Press Computer Dictionary, Third Edition, Microsoft Press Publishing, 1997, p. 197.

Eric Prud'hommeaux, "XML–based HTTP Server Configuration Language," http://www.w3.org/1999/07/9–http–server–conf.html, Sep. 7, 1999, XP–002152599, pp. 1–5.

Nathan J. Muller, "Design and Conquer," Oct. 1996, *BYTE*, vol. 21, No. 10, XP 000683573, pp. 93–98.

(Continued)

*Primary Examiner*—Mehmet B. Geckil
(74) *Attorney, Agent, or Firm*—Hickman Palermo Truong & Becker, LLP; Edward A. Becker

(57) ABSTRACT

A method and apparatus for defining and deploying a networked computer system features creating and storing a textual representation of a logical configuration of the networked computer system according to a structured markup language. Based on the textual representation, one or more commands are generated for configuring an operable computer system that conforms to the logical configuration. The commands may be directed to devices that are interconnected to one or more computing elements and storage devices, to instruct the devices to logically connect the computing elements and storage devices into the computer system. As a result, a real-world virtual server farm or data center may be created and deployed substantially instantly.

40 Claims, 15 Drawing Sheets

U.S. PATENT DOCUMENTS

| | | | | | |
|---|---|---|---|---|---|
| 5,590,284 | A | | 12/1996 | Crosetto | |
| 5,659,786 | A | | 8/1997 | George et al. | |
| 5,751,967 | A | | 5/1998 | Raab et al. | |
| 5,819,042 | A | | 10/1998 | Hansen | |
| 5,821,937 | A | | 10/1998 | Tonelli et al. | |
| 5,951,683 | A | | 9/1999 | Yuuki et al. | |
| 5,974,563 | A | | 10/1999 | Beeler, Jr. | |
| 6,182,139 | B1 | | 1/2001 | Brendel | |
| 6,212,559 | B1 | * | 4/2001 | Bixler et al. | 709/221 |
| 6,230,200 | B1 | | 5/2001 | Forecast et al. | |
| 6,381,321 | B1 | | 4/2002 | Brown et al. | |
| 6,389,432 | B1 | | 5/2002 | Pothapragada et al. | |
| 6,446,141 | B1 | | 9/2002 | Nolan et al. | |
| 6,466,559 | B1 | | 10/2002 | Johansson et al. | |
| 6,505,229 | B1 | | 1/2003 | Turner et al. | |
| 6,597,956 | B1 | * | 7/2003 | Aziz et al. | 700/3 |
| 2002/0052941 | A1 | * | 5/2002 | Patterson | 709/223 |

OTHER PUBLICATIONS

Rob Short, et al., "Windows NT Clusters for Availability and Scalability," 1997 IEEE, pp. 8–13.

Elliotte Rusty Harold, "XML: Extensible Markup Language," 1998, pp. 1–431.

Radek Vingralek, et al., "Snowball: Scalable Storage on Networks of Workstations with Balanced Load," pp. 117–156, Distributed and Parallel Databases, vol. 6, No. 2, Apr. 1998, XP–002162201.

Armando Fox, et al., "Cluster–Based Scalable Network Services," pp. 78–91, Operating Systems Review (SIGOPS), US, ACM Headquarter, New York, vol. 31, No. 5, Dec. 1, 1997, XP–000771023.

* cited by examiner

SYMBOLIC DEFINITION OF A COMPUTER SYSTEM

RELATED APPLICATIONS; PRIORITY CLAIMS

This application is a continuation-in-part of application Ser. No. 09/502,170, filed Feb. 11, 2000, entitled "Extensible Computing System," naming Ashar Aziz et al. as inventors. Domestic priority is claimed under 35 U.S.C. 119 from such application and from prior Provisional application Ser. No. 60/212,925, filed Jun. 19, 2000, entitled "Symbolic Definition of a Virtual Computer System," and naming as inventors Ashar Aziz, Martin Patterson, Thomas Markson.

FIELD OF THE INVENTION

The present invention generally relates to data processing in the field of networking. The invention relates more specifically to a method and apparatus for symbolically creating a definition of a computer system.

BACKGROUND OF THE INVENTION

Data processing users desire to have a flexible, extensible way to rapidly create and deploy complex computer systems and data centers that include a plurality of servers, one or more load balancers, firewalls, and other network elements. One method for creating such a system is described in co-pending U.S. Patent Application Ser. No. 09/502,170, filed Feb. 11, 2000, entitled "Extensible Computing System," naming Ashar Aziz et al. as inventors, the entire disclosure of which is hereby incorporated by reference as if fully set forth herein. Aziz et al. disclose a method and apparatus for selecting, from within a large, extensible computing framework, elements for configuring a particular computer system. Accordingly, upon demand, a virtual server farm or other data center may be created, configured and brought on-line to carry out useful work, all over a global computer network, virtually instantaneously.

Although the methods and systems disclosed in Aziz et al. are powerful and flexible, users and administrators of the extensible computing framework, and the virtual server farms that are created using it, would benefit from improved methods for defining and deploying virtual server farms. For example, an improvement upon Aziz et al. would be a way to specify, price, order and deploy virtual server farms using a networked computer workstation and a standard browser.

Using one known online service, "Rackspace.com," a user may select a server platform, configure it with a desired combination of disk storage, tape backup, and certain software options, and then purchase use of the configured server on a monthly basis. However, this service is useful only for configuring a single server computer. Further, the user interface is rudimentary and relies only on pull-down lists and other elements defined in Hypertext Markup Language (HTML).

Visual programming is a known method for rapidly defining a computer program by linking together graphical icons that represent program elements. For example, U.S. Pat. No. 5,163,130 (Jean-Marie Hullot, NeXT Computer, Inc., 1992) discloses a visual programming method in which computer program elements are selected from a palette and moved into a graphical representation of the logical flow of the program.

Microsoft Visio is a well-known tool for creating graphical presentations useful in business and industry. An end user may create a Visio presentation by dragging and dropping symbols into a workspace. Complex pictures and diagrams can be created. Templates or "stencils" may be created and distributed, enabling others to create new pictures and diagrams that have the same appearance parameters as the stencil that is used as a basis for the new diagrams.

Based on the foregoing, there is a clear need in this field for a way to visually create a logical description of a virtual server farm, or other computer system configurations that are created based on the extensible computing framework described in Aziz et al., and to instantiate a tangible system substantially instantly.

There is a specific need for a way to create such a description using graphic icons and other symbols that represent elements of a real server farm or other computer system.

There is also a need for a way to use the visual representation, or a resulting logical description of a computer system, to prepare a quote for fees and costs involved in creating, configuring and activating a real computer system that embodies the visual representation. There is a related need for a way to prepare such quotes on a rapid basis for use in connection with short-lived server farms and similar computer facilities.

There is also a need for a way to determine whether a particular institution, which is requested to implement the visual representation, has sufficient resources to create, configure and activate a real computer system that embodies the visual representation.

There is a further need for a way to save a visual representation so that it can be retrieved and modified at a later time.

End users also would find it useful to have a way to negotiate fees and costs for a particular virtual server farm with the service provider that is providing the hardware to implement the server farm. There is also a need for a way to cause instant creation of a physical server farm based on creating a graphical representation of the server farm. There is a need to provide such a tool in a way that is integrated with pre-existing graphic design tools that are compatible or based upon HTML or other personal computer software or systems.

SUMMARY OF THE INVENTION

The foregoing needs, and other needs that will become apparent from the following description, are achieved by the present invention, which comprises, in one aspect, a method of defining and deploying a networked computer system. A textual representation that provides a mapping of the physical and a logical configuration of the networked computer system is created and stored, according to a structured markup language. Based on the textual representation, one or more commands are generated for one or more switch devices that are interconnected to one or more computing elements and storage devices. The commands instruct the switch devices to physically couple the computing elements and storage devices into an operable physical computer system that conforms to the logical configuration. As a result, a textual language may be used to-specify one or more instant data centers or virtual server farms, and physical elements to implement the data centers or virtual server farms are then configured and activated as specified in the commands.

In another feature, the textual representation comprises at least one server role definition comprising at least a role name value and a hardware type value, and one or more definitions of servers of the networked computer system, wherein each definition of a server uses and references the server role definition. Another feature is that the textual representation comprises at least one server role definition comprising at least a role name value and a hardware type value, and a plurality of definitions of servers in a "server tier" of the networked computer system, wherein each definition of a server uses and references the server role definition. In this context, the term "server tier" refers to a group of one or more servers that are identical with respect to hardware and software configuration, except for network address (e.g., Internet Protocol ("IP") address).

According to another feature, the textual representation comprises at least one definition of a load balancing function; at least one server tier definition that defines a plurality of servers that receive inbound traffic from the load balancing function; and at least one fixed server definition that defines a fixed server that is associated with one of the servers in the server tier. A related feature is that the definition of the load balancing function comprises an indication that inbound traffic directed to the load balancing function arrives from an outer virtual local area network. The load balancing function can be associated with a server tier such that when an additional server is added to a tier, a physical load balancer that carries out the load balancing function is automatically updated in order to carry out load balancing with respect to the new server.

In another feature, the textual representation comprises at least one server tier definition that defines a plurality of servers that receive inbound traffic from a load balancing function; and at least one definition of the load balancing function, comprising an output interface value, an input interface value, a virtual address value, a load balancing policy value, and a tier value that identifies the server tier that is managed using the load balancing function. A related feature involves creating and storing at least one server tier definition that defines a plurality of servers that receive inbound traffic from the load balancing function. Each server tier definition comprises one or more input interface values, a role value, and information specifying a maximum number of physical servers and a minimum number of physical servers for use in a server tier represented by the server tier definition.

In another feature, the textual representation comprises at least one fixed server definition that defines a statically addressed server of the networked computer system; and wherein each server definition comprises one or more input interface values that identify the interfaces that are on a specific virtual local area network, a role value that identifies a processing role carried out by the server, and information specifying a network address of the server.

According to still another feature, the method also includes associating a first server definition of the textual representation with a graphical icon. The first server definition comprises at least one external entity declaration that represents a network address of a server that is represented by the first server definition. In the textual representation, a copied server definition is created and stored, based on duplicating the first server definition that is associated with the graphical icon. Each external entity declaration of the server definition of the textual representation and the copied server definition of the textual representation is resolved into a different actual network address. Based on the textual representation, one or more commands are generated for one or more switch devices and computing devices that are interconnected to one or more computing elements and storage devices. Such commands may include IP address updates, DNS updates, etc. The commands instruct the switch devices to logically connect the computing elements and storage devices into an operable computer system that conforms to the logical configuration.

In another feature, the textual representation may comprise one or more firewall definitions, wherein each firewall definition comprises a firewall name value, a plurality of interface values that define logical connections to a firewall device associated with the firewall definition, and one or more definitions of services that the firewall is allowed to permit or deny.

In still another feature, the textual representation comprises at least one server role definition comprising at least a role name value and a hardware type value; a disk attribute definition that defines additional local disk storage for the server defined in the server role definition, comprising a drive name value and a drive size value; and one or more definitions of servers of the networked computer system. Each definition of a server uses and references the server role definition. A related feature involves generating one or more commands that allocate disk space according to the drive size value in a storage device that is accessible using a storage area network interface. The allocated disk space is mapped to a server of the networked computer system that implements one of the definitions of servers. The allocated disk space may be presented as a single logical volume, or as one or more logical disks that are created from logical volumes that are located on one or more physical disk drives.

In still another feature, the textual representation comprises an action definition that defines actions for execution for each server in a first tier of one or more servers when an additional server is added to the first tier or to the second tier. The action definition may comprise a tier name value that identifies the tier, and a script name value that identifies a script of actions for execution with respect to each server in the tier identified by the name value or another tier. The method also may involve receiving information indicating that a new server has been added to the tier; executing the script of actions with respect to each server in the tier.

In yet another feature, the textual representation comprises an action definition that defines actions for execution for each server in a first tier of one or more servers when one of the servers is removed from the first tier or another tier. The action definition may comprise a tier name value that identifies the tier, and a script name value that identifies a script of actions for execution with respect to each server in the tier identified by the name value or another tier. Action definitions generally comprise definitions corresponding to those actions that would be carried out in adding a server to a server farm manually. A related feature may involve receiving information indicating that one of the servers has been deleted from the tier and executing the script of actions with respect to each server in the tier or another tier.

Based on the textual representation, one or more commands are generated for one or more switch devices or other network that are interconnected to one or more computing elements and storage devices. The commands instruct the switch devices to logically connect the computing elements and storage devices into an operable computer system that conforms to the logical configuration.

In another feature, storage is automatically requested and assigned to a data center or server firm based on a textual representation of the requested storage. For example, a storage definition is provided in the textual representation that specifies a requested quantity of storage for association with the computer system that is defined in the textual representation. A stored table maps logical units of storage available for use in the computer system. An assignment of storage to the computer system is requested and obtained from a storage subsystem that actually holds the storage. A mapping is automatically created and stored in a gateway device that correlates the assigned storage to a port of the gateway device that is associated with a processing unit of the computer system. As a result, the gateway can properly route information storage and retrieval requests and responses between the CPU and the storage subsystem, and the amount of storage assigned to a server farm or data center can change dynamically during operation of the server farm or data center.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for defining a networked computer system using a textual representation is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In this document, the terms "virtual server farm," "VSF," "instant data center," and "IDC" are used interchangeably to refer to a networked computer system that comprises the combination of more than one processor, one or more storage devices, and one or more protective elements or management elements such as a firewall or load balancer, and that is created on demand from a large logical grid of generic computing elements and storage elements of the type described in Aziz et al. These terms explicitly exclude a single workstation, personal computer, or similar computer system consisting of a single box, one or more processors, storage device, and peripherals.

Embodiments are described in sections of this document that are organized according to the following outline:

1. FUNCTIONAL OVERVIEW
2. BUILDING BLOCKS FOR INSTANT DATA CENTERS
3. EDITOR FOR CREATING INSTANT DATA CENTERS
4. FARM EDITOR MARKUP LANGUAGE OVERVIEW AND PROCESSING
5. SYMBOLIC DEFINITION LANGUAGE SPECIFICS
5.1 CONCEPTS
5.2 LANGUAGE DESCRIPTION
5.2.1 SUBNET DEFINITION
5.2.2 INTERFACE DEFINITION
5.2.3 DISK DEFINITION
5.2.4 SERVER ROLE DEFINITION
5.2.5 FIXED SERVER DEFINITION
5.2.6 SERVER TIER DEFINITION
5.2.7 LOAD BALANCER
5.2.8 FIREWALL DEFINITION
5.2.9 DEVICE DEFINITION
5.3 SERVER CLONING
5.4 EXAMPLE COMPLETE SERVER FARM DESCRIPTIONS
5.4.1 EXAMPLE TWO-TIER SERVER FARM
5.4.2 THREE-TIER SERVER FARM EXAMPLE
5.5 FARM MONITORING
5.6 FARM CLONING
5.7 EXAMPLE TEXTUAL REPRESENTATIONS OF DATA CENTERS OR SERVER FARMS
5.7.1 USE OF FIREWALL IN A SERVER FARM
5.7.2 SPECIFYING EXTRA LOCAL DRIVES
5.7.3 THREE-TIER DATA CENTER
6. DOCUMENT TYPE DEFINITIONS (DTDS)
7. HARDWARE OVERVIEW

1. FUNCTIONAL OVERVIEW

Figure 1A:
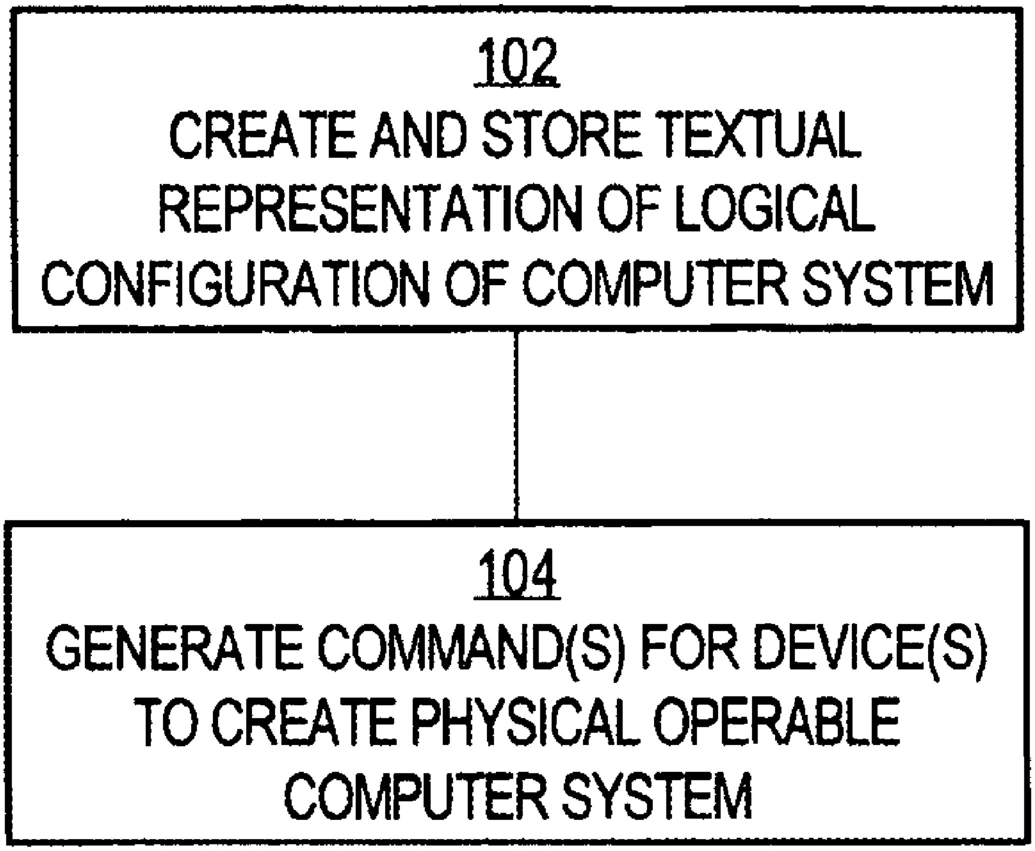
FIG. 1A is a block diagram illustrating a top-level view of a process of defining a networked computer system.

FIG. 1A is a block diagram illustrating an overview of a method of defining a networked computer system. A textual representation of a logical configuration of the computer system is created and stored, as shown in block 102. In block 104, one or more commands are generated, based on the textual representation, for one or more switch device(s). When the switch devices execute the commands, the networked computer system is created and activated by logically interconnecting computing elements. In the preferred embodiment, the computing elements form a computing grid as disclosed in Aziz et al.

Figure 1B:
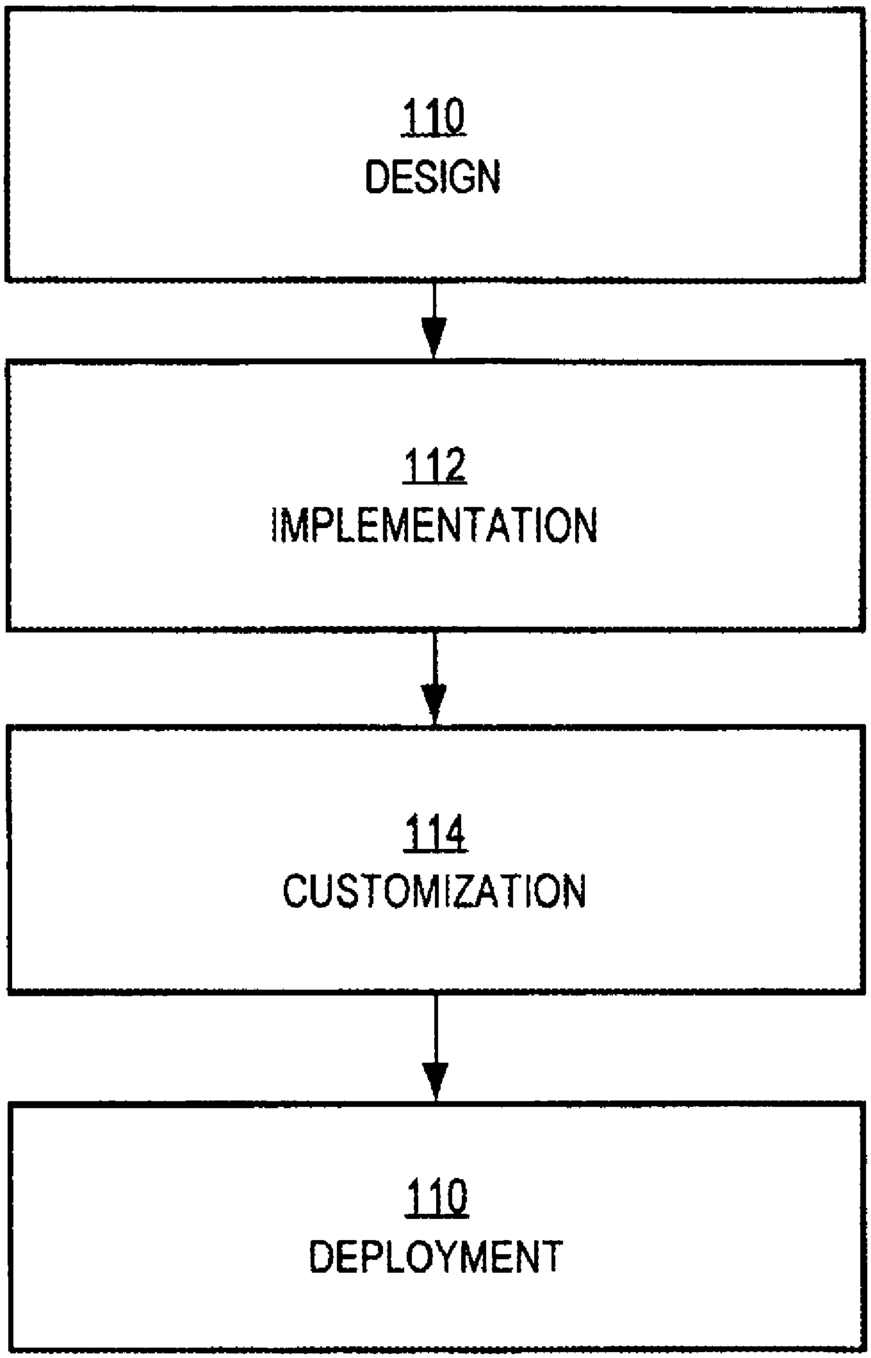
FIG. 1B is a block diagram illustrating another view of a process of defining a networked computer system.

FIG. 1B is a block diagram illustrating a more detailed view of the process of FIG. 1A. Generally, a method of creating a representation of a data center involves a Design phase, an Implementation phase, a Customization phase, and a Deployment phase, as shown by blocks 110, 112, 114, 116, respectively.

In the Design phase, a logical description of a data center is created and stored. Preferably, the logical description is created and stored using a software element that generates a graphical user interface that can be displayed by, and receive input from, a standard browser computer program. In this context, "browser" means a computer program that can display pages that conform to Hypertext Markup Language (HTML) or the equivalent, and that supports JavaScript and Dynamic HTML, e.g., Microsoft Internet Explorer, etc. To create a data center configuration, a user executes the graphical user interface tool. The user selects one or more icons representing data center elements (such as servers, firewalls, load balancers, etc.) from a palette of available elements. The end user drags one or more icons from the palette into a workspace, and interconnects the icons into a desired logical configuration for the data center.

In the Implementation phase of block 112, the user may request and receive cost information from a service provider who will implement the data center. The cost information may include, e.g., a setup charge, monthly maintenance fee, etc. The user may manipulate the icons into other configurations in response to analysis of the cost information. In this way, the user can test out various configurations to find one that provides adequate computing power at an acceptable cost.

In Customization phase of block, after a data center is created, a configuration program is used to add content information, such as Web pages or database information, to one or more servers in the data center that was created using the graphical user interface tool. In the Customization phase, the user may save, copy, replicate, and otherwise edit and manipulate a data center design. Further, the user may apply one or more software images to servers in the data center. The selection of a software image and its application to a server may be carried out in accordance with a role that is associated with the servers. For example, if a first server has the role Web Server, then it is given a software image of an HTTP server program, a CGI script processor, Web pages, etc. If the server has the role Database Server, then it is given a software image that includes a database server program and basic data. Thus, the user has complete control over each computer that forms an element of a data center. The user is not limited to use of a pre-determined site or computer.

In the Deployment phase of block 116, the data center that has been created by the user is instantiated in a computing grid, activated, and initiates processing according to the server roles.

Figure 1C:
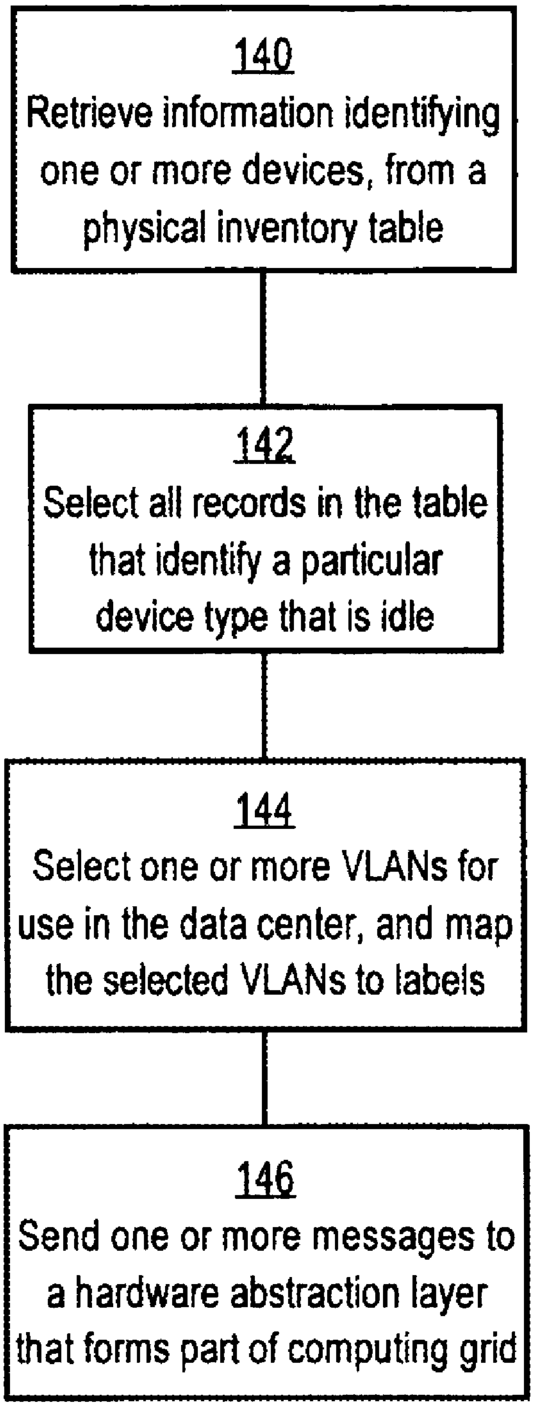
FIG. 1C is a flow diagram of a process of deploying a data center based on a textual representation.

FIG. 1C is a flow diagram of a process of deploying a data center based on a textual representation.

In block 140, the process retrieves information identifying one or more devices, from a physical inventory table. The physical inventory table is a database table of devices, connectivity, wiring information, and status, and may be stored in, for example, control plane database 135. In block 142, the process selects all records in the table that identify a particular device type that is idle. Selection of such records may be done, for example, in an SQL database server using a star query statement of the type available in the SQL language.

Database 131 also includes a VLAN table that stores up to 4096 entries. Each entry represents a VLAN. The limit of 4096 entries reflects the limits of Layer 2 information. In block 144, the process selects one or more VLANs for use in the data center, and maps the selected VLANs to labels. For example, VLAN value "11" is mapped to the label Outer_VLAN, and VLAN value "12" is mapped to the label Inner_VLAN.

In block 146, the process sends one or more messages to a hardware abstraction layer that forms part of computing grid 132. Details of the hardware abstraction layer are set forth in Aziz et al. The messages instruct the hardware abstraction layer how to place CPUs of the computing grid 132 in particular VLANs. For example, a message might comprise the information, "Device ID=5," "Port (or Interface)=eth0," "vlan=v1." An internal mapping is maintained that associates port names (such as "eth0" in this example) with physical port and blade number values that are meaningful for a particular switch. In this example, assume that the mapping indicates that port "eth0" is port 1, blade 6 of switch device 5. Further, a table of VLANs stores a mapping that indicates that "v1" refers to actual VLAN "5". In response, the process would generate messages that would configure port 1, blade 6 to be on VLAN 5. The particular method of implementing block 146 is not critical. What is important is that the process sends information to computing grid 132 that is sufficient to enable the computing grid to select and logically interconnect one or more computing elements and associated storage devices to form a data center that corresponds to a particular textual representation of the data center.

Figure 1D:
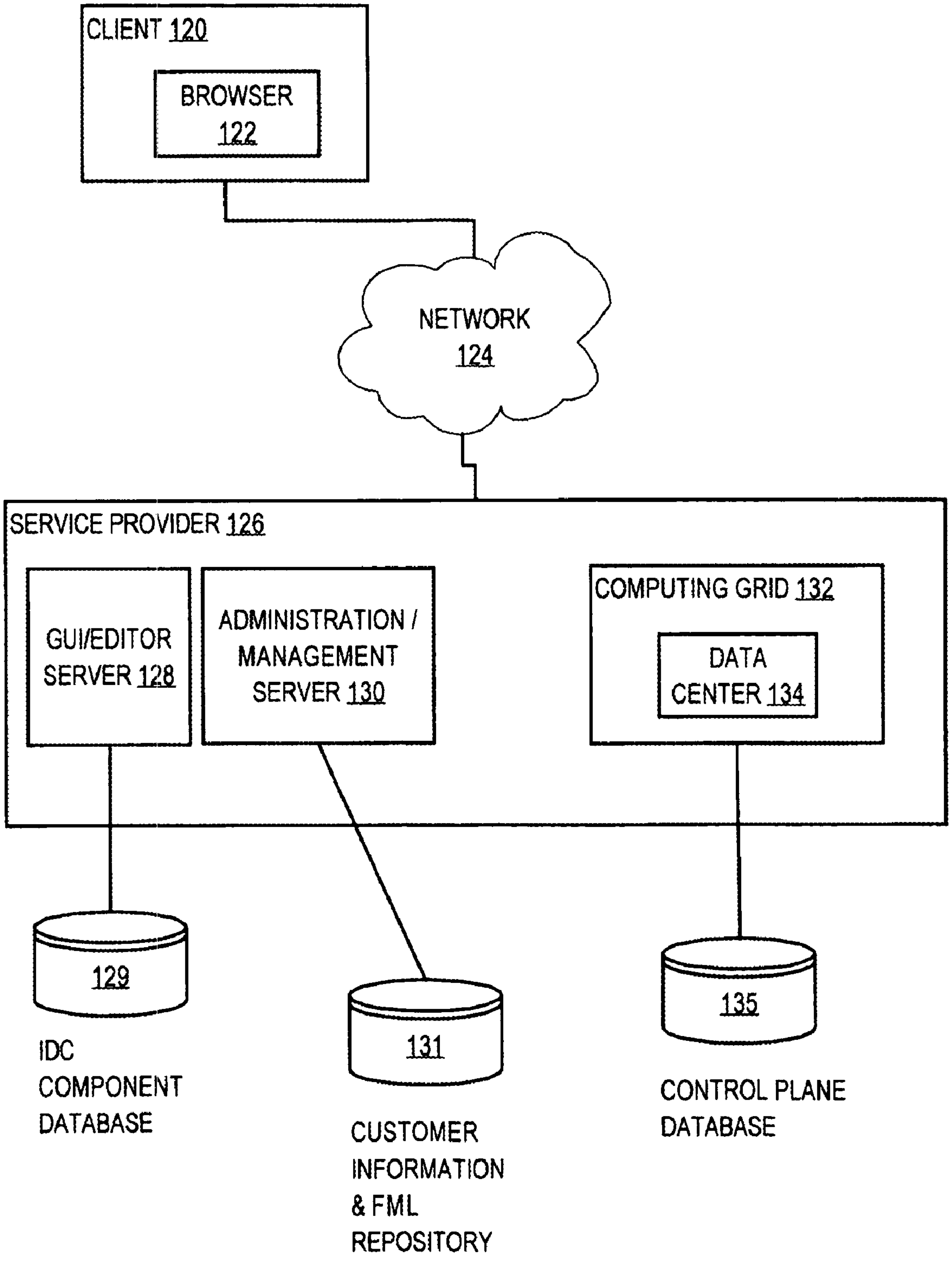
FIG. 1D is a block diagram showing a client and a service provider.

FIG. 1D is a block diagram showing a client and a service provider in a configuration that may be used to implement an embodiment. Client 120 executes a browser 122, which may be any browser software that supports JavaScript and Dynamic HTML, e.g., Internet Explorer. Client 120 communicates with service provider 126 through a network 124, which may be a local area network, wide area network, one or more internetworks, etc.

Service provider 126 is associated with a computing grid 132 that has a large plurality of processor elements and storage elements, as described in Aziz et al. With appropriate instructions, service provider 126 can create and deploy one or more data centers 134 using elements of the computing grid 132. Service provider also offers a graphical user interface editor server 128, and an administration/management server 130, which interact with browser 122 to provide data center definition, management, re-configuration, etc. The administration/management server 130 may comprise one or more autonomous processes that each manage one or more data centers. Such processes are referred to herein as Farm Managers. Client 120 maybe associated with an individual or business entity that is a customer of service provider 126.

2. BUILDING BLOCKS FOR INSTANT DATA CENTERS

As described in detail in Aziz et al., a data center may be defined in terms of a number of basic building blocks. By selecting one or more of the basic building blocks and specifying interconnections among the building blocks, a data center of any desired logical structure may be defined. The resulting logical structure may be named and treated as a blueprint ("DNA") for creating any number of other IDCs that have the same logical structure. Thus, creating a DNA for a data center facilitates the automation of many manual tasks involved in constructing server farms using prior technologies.

As defined herein, a data center DNA may specify roles of servers in a data center, and the relationship of the various servers in the roles. A role may be defined once and then re-used within a data center definition. For example, a Web Server role may be defined in terms of the hardware, operating system, and associated applications of the server, e.g., dual Pentium of a specified minimum clock rate and memory size, NT version 4.0, Internet Information Server version 3.0 with specified plug-in components. This Web Server role then can be cloned many times to create an entire Web server tier. The role definition also specifies whether a role is for a machine that is statically assigned, or dynamically added and removed from a data center.

One basic building block of a data center is a load balancing function. The load-balancing function may appear at more than one logical position in a data center. In one embodiment, the load-balancing function is implemented using the hardware load-balancing function of the L2-7 switching fabric, as found in ServerIron switches that are commercially available from Foundry Networks, Inc., San Jose, Calif. A single hardware load-balancing device, such as the Server Iron product that is commercially available from Foundry, can provide multiple logical load balancing functions. Accordingly, a specification of a logical load-balancing function generally comprises a virtual Internet Protocol (VIP) address value, and a load-balancing policy value (e.g., "least connections" or "round robin"). A single device, such as Foundry ServerIron, can support multiple VIPs and different policies associated with each VIP. Therefore, a single Foundry Server Iron device can be used in multiple logical load balancing positions in a given IDC.

Figure 7:
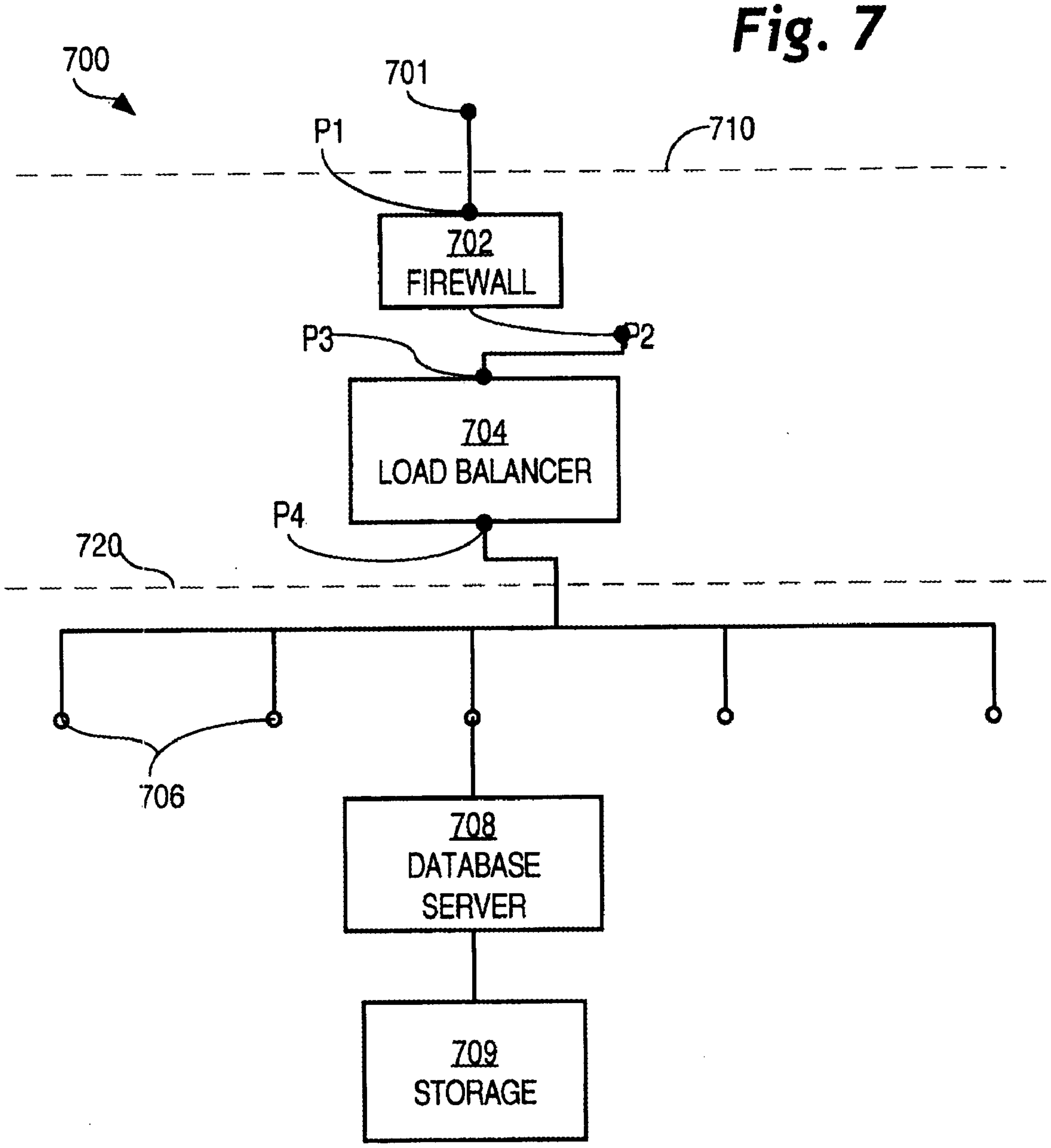
FIG. 7 is a block diagram of an example of a two-tier server farm.

One example use of a load-balancing function is to specify that a Web server tier is load balanced using a particular load-balancing function. FIG. 7, discussed further below, presents an example of a two-tier IDC, having a Web server tier with a database server tier, with load balancing of this type. When a tier is associated with a load balancer, automatic processes update the load balancer in response to a user adding or removing a server to or from the server tier. In an alternative embodiment, other devices are also automatically updated.

Another example use of a load-balancing function is to specify a load-balancing function for a tier of application servers, which are logically situated behind the load-balanced Web server tier, in a 3-tier configuration. This permits clustering of the application server tier to occur using hardware load balancing, instead of application specific load balancing mechanisms. This approach may be combined with application-specific clustering mechanisms.

Other building blocks include firewalls, servers, storage, etc.

3. EDITOR FOR CREATING INSTANT DATA CENTERS

In an embodiment, a graphical user interface tool ("editor") is provided for use in defining one or more instant data centers (IDCs). In one embodiment, the editor enables a user to define a data center by selecting icons representing computing elements, firewalls, load balancers, etc., and connecting them in a desired logical structure. The editor preferably forms part of a customer control center application that provides numerous additional administration and management functions for defining and interacting with IDCs.

For example, an embodiment of a customer control center may provide creation of customer accounts; presentation of a customer home page with information specific to a particular customer; design and creation of instant data centers; configuration management; an event viewer; monitoring of IDCs that are deployed and executing tasks; reports on the status and performance of IDCs; management of back-up and restore operations for IDCs; service and account administration; and customer support. Using these functions, the customer control center enables a user to visually design one or more IDCs, and specify associated service parameters, such as backup policy. In conjunction with a sales process, the customer can request the validation of an IDC design for implementation. The user may activate approved, validated IDC designs; this results in creating an operational computing center that is remotely accessible, ready for customization and test prior to full-scale deployment. Additionally, there may be remote access to servers for customization (e.g., addition of content or applications), monitoring and management of operations, scaling through cloning and addition of servers, network and storage capability, and customer care functions through a service desk facility.

Creation of customer accounts may include: creation and management of customer accounts; providing a data entry template and fields for customer information; and creating and storing selected levels of access privileges for users. In one embodiment, creation of a customer account is a preferred means by which a new customer is registered in the system. Creation of a customer account can be carried out by an employee of Service Provider 126 in the presence of a customer, or by telephone, or by a customer itself. In the registration process, customer identifying information is entered and stored, e.g., customer name, customer title, company name, company address, company phone number, customer contact information, customer email address, marketing information login password, etc. A customer is then designated as possessing one or more of the roles identified above. Creation of customer accounts may be carried out using application software from the Clarify eBusiness Applications unit of Nortel Networks, San Jose, Calif.

Preferably, each user is associated with a role (administrator, manager, service provider, customer, etc.), and each user role implicitly carries a particular permission level. In a preferred embodiment, a privilege hierarchy is defined in which a master administrator is superior to one or more service providers; each service provider is superior to one or more customers of the service provider; and each customer is superior to one or more service level agreements entered into between the customer and its service provider. In this approach, each user's scope of authority is limited to subordinate nodes or users. For example, customers can see and manipulate only their own IDCs and services, and a particular service provider can see and manipulate only its customers. Other customer account functions may include integration into a customer database, addition and deletion of specific individuals or customers over the life of an account, and password management.

Based on this hierarchy, a plurality of privileges are defined, as illustrated in Table 1.

TABLE 1

| PRIVILEGE EXAMPLES |
|---|
| 1. A view-only privilege for management personnel. This level of access enables a customer to log into the customer control center and only view high-level monitoring and report data. Not all reports and monitoring data can be viewed by this privilege level, which is the lowest level. |
| 2. A view-only privilege for operations personnel. This level of access is for IT operations team members who have personal responsibility for infrastructure management, and thus have the need to see detailed reports and monitoring data. |
| 3. A management/design privilege. At this level, customers have access to all the tools that are provided for creation and maintenance of the infrastructure. |
| 4. An approval privilege. Customers at this level are required to approve any changes to the infrastructure. These customers are likely to be in the management chain of the employees who hold |

TABLE 1-continued

| PRIVILEGE EXAMPLES |
| --- |
| the management privilege. Their electronic approval is required for any infrastructure changes. |
| 5. A guest privilege. Used for sales, marketing, and demonstration purposes. |

Creation of a customer account may also involve entering a customer service profile that identifies the services to which the customer is subscribing.

The customer home page is the starting location for each customer upon login. It serves as a portal to the rest of the customer control center. Further, it serves as a place at which news, events or activities are highlighted. All classes of users can access the customer home page. Presentation of a customer home page may include presentation of system-wide network status information; system wide alert information; system-wide maintenance schedule information; CERT advisories, system-wide environmental data; providing an online bulletin board for notification and availability of software updates; providing top level IDC status information; and providing marketing updates, e.g., availability of new services and competition updates.

Design and creation of Instant Data Centers generally involves providing a drag-and-drop graphical editor with which a user may draw server farm designs. In a preferred embodiment, the editor includes a palette that features icons representing standard server farm elements. For example, icons may represent hardware elements such as firewalls (e.g., Nokia); load-balancers (e.g., Foundry ServerIron XL); servers (e.g., one or more icons for Dell or Sun servers having various processor combinations, NT/IIS servers implemented using an HP NetServer LPr 2×700 Mhz platform); database servers (e.g., an icon for a server having various processor and RAM configurations); generic or general purpose servers (e.g., icons for an Intel/Linux server, intel/NT server, and Solaris/Sun server having various processor and RAM configurations); and Internet/network connectivity (e.g., an icon representing the Internet, icons representing simulated network loads for use in stress testing).

Other functions of the editor may include defining tiers (i.e., a group of identical systems); automatic configuration and reconfiguration of load balancer(s) as an IDC scales in size; automatic configuration of firewalls; connect or wire-up discrete elements into a fully functional multi-tier network; copying or pasting server elements using server cloning; and deleting elements.

The editor may be implemented, for example, in the form of a software plug-in for Microsoft Visio such that a Visio drawing may be saved in FML format. Alternatively, the editor may be implemented as a standalone software application program that can accept Visio format drawings as input. The editor may provide the ability to display a graphical representation of a virtual server farm in an alternative view format, e.g., a spreadsheet view having one row for each element in the virtual server farm. The view format also may be FML source text format, binary format, etc. Functions for converting from a view of one format to another may be provided.

The editor may also provide the ability to "submit" a design of a data center for review and approval by Service Provider 126, and the ability to save and organize designs in a folder-like structure, including naming different designs or IDCs. Another function may provide the ability to designate the status of designs, using various status values, e.g., IDC in design (under construction), IDC pending validation, Approved IDC—inactive, Active IDC, Archived IDC. Yet another function may provide an ability to activate approved designs, including manual activation by the customer, when needed; designating a start date and time for activation; and designating a duration of activation (e.g., by start and end date)

Server farm element configuration is provided so that once a logical server farm architecture is created and stored, a customer can configure each element of the server farm with appropriate software, e.g., software other than the operating system or other basic server software. The customer is given access to each element to configure the machines with desired software. The server farm element configuration function may have numerous sub-functions. For example, in one embodiment, a sub-function enables a user to remotely and secure login into any individual element within an IDC, using Secure Shell (SSH), a PCAnywhere client, etc.

Another function provides information on the status and location of tapes or other media that customers have sent to Service Provider 126 for loading on to their IDC(s). For example, a customer can send in tapes of other media, and Service Provider 126 loads the media in a device in an online staging location that is accessible and viewable by the customer. The Service Provider 126 notifies the customer when the media is accessible at that location, and provides the location. The customer then remotely loads a software image from the specified location to each machine that needs the image.

Still another function enables configuration of non-standard, customer configured server farm elements, for example, application servers, NFS servers, FTP servers, mail servers, etc. Yet another function may provide the ability to download software images via the Internet to any element of an IDC.

Using another sub-function, a user can view and modify detailed property values for any element within an IDC, e.g., element type/role, tier identification, element name, hardware configuration (CPU, Memory, Disk), software configuration (installed software images, versions for those images, designation of maintenance ownership of each image (e.g., Service Provider 126 or customer)). Another sub-function provides software patch and upgrade management, including the ability to upgrade IDC elements with the latest patches and upgrades for software images. This may include providing a menu of all patches for all software packages that are supported for various server and platform types, although such functionality is not required. A customer may request the installation of patches, and the system can provide notification to customers about the availability of new patches or upgrades and how they can be installed onto their IDCs.

The Event Viewer function can be used to track changes in status for each IDC, by providing time stamping for events, information identifying the originator of an event, and event detail. Events may include addition or removal of one or more IDC elements, generation of back-up logs, and generation of downtime logs. Thus, the Event Viewer provides a way to see a running log of IDC activity.

Monitoring is the real-time observation of an active IDC. Monitoring functions provide real-time status information about each IDC and its associated elements. Monitoring may result in creating one or more events in response to monitored conditions, including alerts or notifications. The Monitoring function may be implemented, for example, using Hewlett-Packard Open View. The function may provide monitoring information for applications (e.g., Oracle database, transaction chains, FTP, email, URLs and URL transaction monitors), servers (e.g., CPU utilization, disk space, memory, network, server services, Web server monitors), network monitors (e.g., DNS, ping, port, and SNMP monitors), etc. Advanced monitors may include a composite monitor, directory monitor, file monitor, LDAP monitor, link check monitor, log file monitor, news monitor, NT Performance/Dialup/Event monitor, script monitor, URL list and content monitor, etc.

A related sub-function may provide customer configuration of alerts and notifications that they want to receive when monitored item reaches predefined thresholds or fails, and how they want to receive them (e.g., email, pager, telephone)

Another function may provide reports on the status and performance of IDCs. Reports are defined as statistical information that is collected over a specified period of time, or the ability to view such information for a specified time period. Whereas monitoring is provided in real time, reports are focused on creating logs and archives of data that interests a customer. For example, the system may generate the following reports: Reports on any of the monitors described herein; traffic patterns; bandwidth usage; active IDCs; customer support history. In one embodiment, there is a customer report request interface that enables a user to view reports using a browser, send reports via email, export of report data for external processing, and access a menu of reports.

The reporting function may also enable customers to select the reports they want to access, and may provide the ability to specify dates or ranges of dates for reports to cover. The reporting functionality may also enable a user to schedule automated generation of reports, e.g. weekly/monthly traffic reports and weekly/monthly billing reports.

In one embodiment, a back-up and restore management function provides a mechanism for customers to manage backup and restore activities. The back-up and restore management function may enable a user to schedule back-ups (e.g., daily incremental backup, weekly full backup, monthly off-line backup). Preferably, there is an interface to a separate customer care system for management of requests. An example of a customer care system is the Remedy trouble ticketing system or the Clarify customer relationship management system.

The service and account administration function deals with the ongoing administration of a customer's account. Using this function, customers may determine which services they wish to purchase and deploy from Service Provider 126. For example, a customer may have multiple IDC designs in their account, some active, some inactive. Not every IDC will utilize all of the same services. One IDC may have Instant Scaling Services turned on while another IDC may simply be a static IDC. Some IDCs may be utilizing the stress testing service, while others may not.

Accordingly, using the service and account administration function, a customer can display a menu or matrix of the IDC designs a customer has created/had approved, the services applied to the IDCs, and the additional services available to the customer for each of those IDCs. Thus, the service and account administration function acts as an order form for a customer.

The service and account administration function may enable a user to display an online matrix of services to which the user subscribes, and how they relate to IDC versions. It may provide billing reports, online viewing of service level agreements, and contract administration.

The customer support function may provide an interface to a customer care system; case management; a communication hierarchy for different kinds of events and provide multiple media vehicles for customers to be notified of such events; online documentation; online help; a solutions database and lists of frequently asked questions; operational procedures documentation; and contact information for customer service representatives.

Figure 1E:
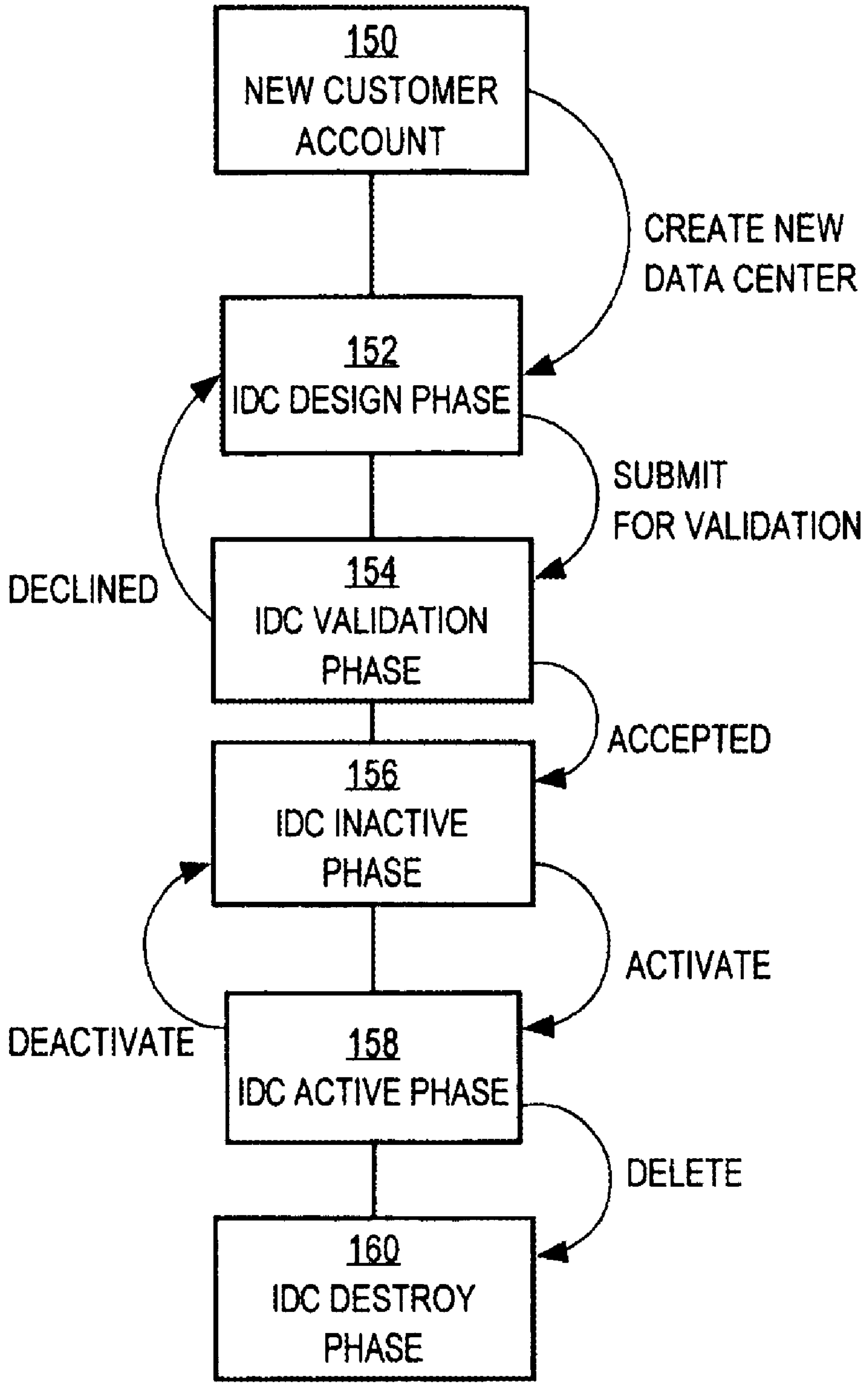
FIG. 1E is a block diagram illustrating stages in the creation and deletion of an instant data center.

FIG. 1E is a block diagram of stages through which an instant data center may pass using a control center having the foregoing functions. In block 150, a new customer account is created using the control center. The customer creates a new instant data center during IDC design phase 152. In IDC validation phase 154, the customer submits the instant data center design to Service Provider 126 for review and validation. If Service Provider 126 declines to validate the IDC, control returns to IDC design phase 152 for modification of the design. If the IDC is accepted by Service Provider 126, it enters an Inactive state, as indicated by block 156. The IDC is activated by the customer, entering an Active state, as represented by block 158.

If the IDC is subsequently de-activated, it returns to the Inactive state of block 156. If the IDC is deleted permanently, IDC destroy phase 160 is carried out, resulting in logical tear-down or destruction of the IDC. Tear-down or deletion of an IDC makes its computing elements available for use in one or more other IDCs.

In one embodiment, an editor useful in creating textual representation of IDCs is implemented in an object-oriented computer programming language, e.g., Java®, C++, etc. The editor creates and stores information according to a predefined object model. As the user creates a graphical representation of a data center, the editor creates and stores a representation of the IDC using objects of the object model.

An object broker is responsible for creating, removing and retrieving programmatic objects that are created according to a specified object model. The object broker may retrieve the model objects by loading them from a custom database, or by interacting with the databases of external systems such as billing system, customer care system, etc. A broker may also create proxies in place of concrete objects to allow lazy loading of model objects and to reduce the large one-time hit of initially loading an entire graph of model objects.

Figure 3A:
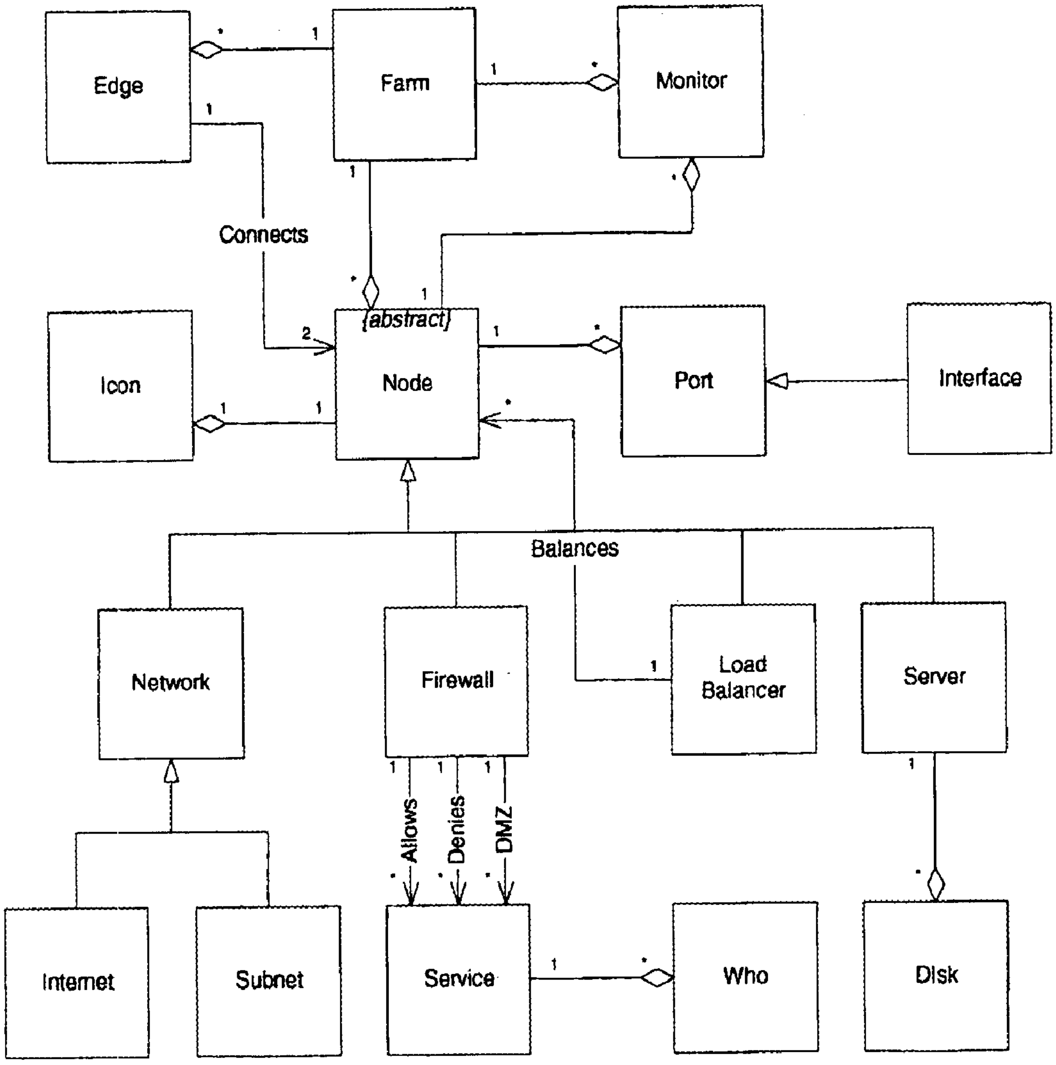
FIG. 3A is a block diagram of an object-oriented information model.

FIG. 3A is a block diagram of an exemplary object model that may be used in an embodiment. The table in APPENDIX 1 herein describes the attributes for each class, the type, the description and the legal values for each of the attributes, and whether they are configurable when the IDC is under design or active.

4. FARM EDITOR MARKUP LANGUAGE OVERVIEW AND PROCESSING

In an embodiment, a textual representation of a data center is created and stored using statements expressed in a language that is based on Extensible Markup Language (XML). In the preferred embodiment, a Farm Editor Markup Language (FEML) is used to describe the topology of a data center. The FEML is defined as a plurality of XML Document Type Definitions (DTDs), as set forth in Table 14 of this document. FEML provides an intermediate representation that may be used to transfer information from the editor object model. It is converted into a final representation, Farm Markup Language (FML), for use in implementing a data center.

Figure 3B:
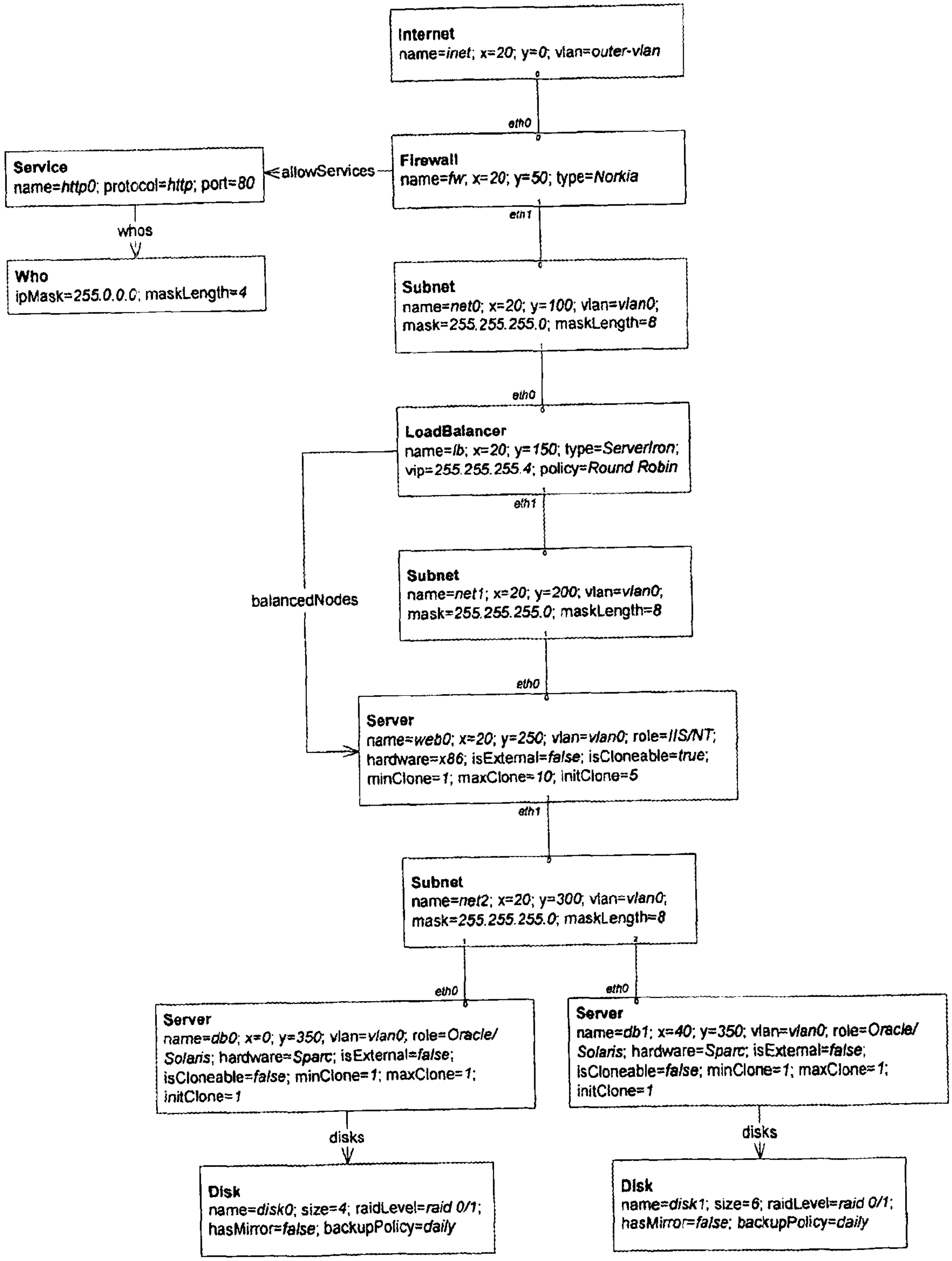
FIG. 3B is a block diagram of an instantiated example of an object model.

FIG. 3B is a block diagram of objects that may be instantiated to represent a particular exemplary data center. The data center illustrated in FIG. 3B may be defined in FEML as set forth in Table 2.

TABLE 2

TEXTUAL REPRESENTATION OF DATA CENTER OF FIG. 3B

```
<?xml version="1.0"?>
<farm name="farm0">
    <!-- Node definitions -->
    <internet name="inet" x="20" y="0" vlan="outer-vlan"/>
    <firewall name="fw" x="20" y="50" type="Nokia">
        <interface name="eth0" network="inet"/>
        <interface name="eth1" network="net0"/>
        <interface name="eth2"/>
        <allow-services>
            <service name="http0" protocol="http" port="80">
                <who ip-mask="255.0.0.0" mask-length="4"/>
            </service>
        </allow-services>
        <deny-services></deny-services>
        <dmz-services></dmz-services>
    </firewall>
    <subnet name="net0" x="20" y="100" vlan="vlan0" mask="255.255.255.0" mask-
    length="8"/>
    <loadbalancer name="lb" x="20" y="150" type="ServerIron" vip="255.255.255.4"
        policy="Round Robin" balanced-nodes="web0">
        <interface name="eth0" network- "net0"/>
        <interface name="eth1" network="net1"/>
    </loadbalancer>
    <subnet name="net1" x="20" y="200" vlan="vlan0" mask="255.255.255.0" mask-
    length="8"/>
    <server name="web0" x="20" y="250" role="IIS/NT" hardware="x86" external="false"
        cloneable="true" min-clone="1" max-clone="10" init-clone="5">
        <interface name="eth0" network="net1"/>
        <interface name="eth1" network="net2"/>
    </server>
    <subnet name="net2" x="20" y="300" vlan="vlan0" mask="255.255.255.0" mask-
    length="8"/>
    <server name="db0" x="0" y="350" role="Oracle/Solaris" hardware="Sparc"
    external="false"
        cloneable="false" min-clone="1" max-clone="1" init-clone="1">
        <interface name="eth0" network="net2"/>
        <interface name="eth1"/>
    </server>
    <server name="db1" x="40" y="350" role="Oracle/Solaris" hardware="Sparc"
    external="false"
        cloneable="false" min-clone="1" max-clone="1" init-clone="1">
        <interface name="eth0" network="net2"/>
        <interface name="eth1"/>
    </server>
    <!-- Edge definitions -->
    <edge begin-node="inet" begin-port="0" end-node="fw" end-port="0"/>
    <edge begin-node="fw" begin-port="1" end-node="net0" end-port="0"/>
    <edge begin-node="net0" begin-port="1" end-node="lb0" end-port="0"/>
    <edge begin-node="lb" begin-port="1" end-node="net1" end-port="0"/>
    <edge begin-node="net1" begin-port="1" end-node="web0" end-port="0"/>
    <edge begin-node="web0" begin-port="1" end-node="net2" end-port="0"/>
    <edge begin-node="net2" begin-port="1" end-node="db0" end-port="0"/>
    <edge begin-node="net2" begin-port="2" end-node="db1" end-port="0"/>
</farm>
```

Based on the FEML text of Table 2, FML text is generated in the form set forth in Table 3.

TABLE 3

FML REPRESENTATION OF TEXT OF TABLE 2

```
<?xml version="1.0"?>
<farm name="farm0">
    <fw name="fw" type="Nokia">
        <interface name="eth0" vlan="outer-vlan" subnet="inet"/>
        <interface name="eth1" vlan="vlan0" subnet="net0"/>
        <interface name="eth2">
        <allow-services>
            <service name="http0" protocol="http" port="80">
                <who ipmask="255.0.0.0" masklen="4"/>
            </service>
        </allow-services>
        <deny-services></deny-services>
```

TABLE 3-continued

FML REPRESENTATION OF TEXT OF TABLE 2

```
        <dmz-services></dmz-services>
        <attribute name="x" value="20"/>
        <attribute name="y" value="50"/>
    </fw>
    <lb name="lb" type="ServerIron">
        <interface name="eth0" vlan="vlan0" subnet="net0"/>
        <interface name="eth1" vlan="vlan0" subnet="net1"/>
        <vip>255.255.255.4</vip>
        <policy>Round Robin</policy>
        <tier-name>web0</tier-name>
```

TABLE 3-continued

FML REPRESENTATION OF TEXT OF TABLE 2

```
        <attribute name="x" value="20"/>
        <attribute name="y" value="150"/>
    </lb>
    <tier name="web0">
        <interface name="eth0" vlan="vlan0" subnet="net1"/>
        <interface name="eth1" vlan="vlan0" subnet="net2"/>
        <role>web0</role>
        <min-servers>1</min-servers>
        <max-servers>1 0</max-servers>
        <init-servers>5</init-servers>
        <attribute name="x" value="20"/>
        <attribute name="y" value="250"/>
    </tier>
    <fixed-server name="db0">
        <interface name="eth0" vlan="vlan0" subnet="net2"/>
        <interface name="eth1"/>
        <role>db0</role>
        <attribute name="x" value="0"/>
        <attribute name="y" value="350"/>
    </fixed-server>
    <fixed-server name="db1 ">
        <interface name="eth0" vlan="vlan0" subnet="net2"/>
        <interface name="eth1"/>
        <role>db1</role>
        <attribute name="x" value="40"/>
        <attribute name="y" value="350"/>
    </fixed-server>
    <server-role name="web0">
        <diskimage>IIS/NT</diskimage>
        <ip>internal</ip>
        <hw>x86</hw>
    </server-role>
    <server-role name="db0">
        <diskimage>Oracle/Solaris</diskimage>
        <ip>internal</ip>
        <hw>Sparc</hw>
        <disk drive name="disk0" drivesize="4">
            <attribute name="raid-level" value="raid 0/1"/>
            <attribute name="remote-mirror" value="false"/>
            <attribute name="backup-policy" value="daily "/>
        </disk>
    </server-role>
    <server-role name="db1">
        <diskimage>Oracle/Solaris</diskimage>
        <ip>internal</ip>
        <hw>Sparc</hw>
        <disk drive name="disk1" drivesize="6">
            <attribute name="raid-level" value="raid 0/1"/>
            <attribute name="remote-mirror" value="false"/>
            <attribute name="backup-policy" value="daily"/>
        </disk>
    </server-role>
    <subnet name="net0" mask="255.255.255.0"
    masklen="8" vlan="vlan0">
        <attribute name="x" value="20"/>
        <attribute name="y" value=" 100"/>
    </subnet>
    <subnet name="net1" mask="255.255.255.0"
    masklen="8" vlan="vlan0">
        <attribute name="x" value="20"/>
        <attribute name="y" value="200"/>
    </subnet>
    <subnet name="net2" mask="255.255.255.0"
    masklen="8" vlan="vlan0">
        <attribute name="x" value="20"/>
        <attribute name="y" value="300"/>
    </subnet>
    <attribute name="edge" value="inet 0 fw 0">
    <attribute name="edge" value="fw 1 net0 0">
    <attribute name="edge" value="net0 1 lb0 0">
    <attribute name="edge" value="lb 1 net1 0">
    <attribute name="edge" value="net1 1 web0 0">
    <attribute name="edge" value="web0 1 net2 0">
    <attribute name="edge" value="net2 1 db0 0">
    <attribute name="edge" value="net2 2 db1 0">
    <attribute name="internet-name" value="inet"/>
    <attribute name="internet-x" value="20"/>
        <attribute name="internet-y" value="0"/>
        <attribute name="internet-vlan" value="outer-vlan"/>
        <attribute name="internet-count" value="1"/>
</farm>
```

Figure 4:
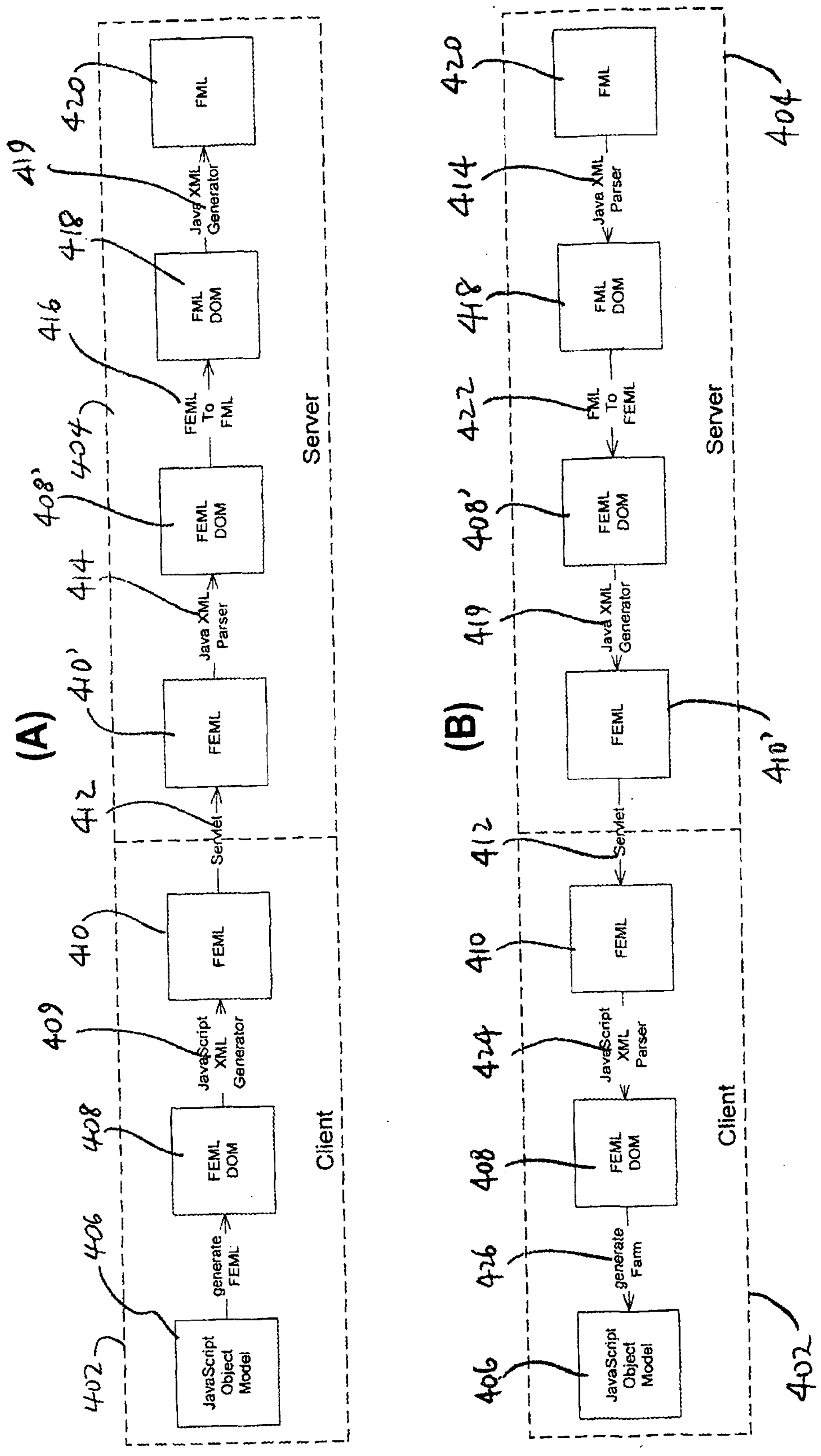
FIG. 4 is a two-part block diagram of a process of creating a text representation of a data center based on an object model representation of the data center, and the converse process.

FIG. 4 is a two-part block diagram that illustrates processes of generating FEML text and FML text based on a JavaScript object model, and the converse process of generating a JavaScript object model based on FML text.

Referring now to FIG. 4(A), a process of generating FML text based on a JavaScript object model is described. At a client 402, a JavaScript object model 406 is created and stored. In the preferred embodiment, client 402 is a browser executed at an end user computer. The JavaScript object model 406 comprises an object representation of a data center that is created and stored by the graphical user interface tool described herein.

Using a client process, which may form part of the graphical user interface tool, text in Farm Editor Markup Language is generated, resulting in creating and storing an FEML object model 408. A JavaScript XML Generator 409 is applied to the FEML object model 408, resulting in creating and storing FEML text 410.

A servlet process 412 transfers a copy of FEML text 410' to server 404. In one embodiment, server 404 is associated with a service provider that implements a computer system based on the FML text and using computing grid elements that are owned, operated, or managed by the service provider. Upon receiving FEML text 410', server 404 applies a Java XML parser 414 to the text, resulting in creating and storing an FEML object model 408'. Normally FEML object model 408' will be a copy of FEML object model 408.

Server 404 then applies an FEML-to-FML converter 416 to the FEML object model 408', resulting in creating and storing an FML object model 418. Server 404 applies a Java XML Generator 419 to the FML object model 418, resulting in creating and storing FML text 420.

In the converse process, shown in FIG. 4(B), the initial input is a set of FML text 420. The Java XML parser 414 is applied to the FML text 420, resulting in creating and storing FML object model 418. An FML to FEML converter process 422 is applied to the FML object model 418, resulting in creating and storing FEML object model 408'. The Java XML Generator 419 is applied to the object model, resulting in creating and storing FEML text 410'.

Servlet 412 passes FEML text 410' from server 404 to client 402, which stores FEML text 410. A JavaScript XML Parser process 424 is applied to FEML text 410, resulting in creating and storing FEML object model 408. Client 402 carries out a Generate-Farm process on FEML object model 408, resulting in creating and storing JavaScript object model 406, which may be imported into and manipulated by the client editor.

5. SYMBOLIC DEFINITION LANGUAGE SPECIFICS

5.1 CONCEPTS

The invention is related to use of a computer system for creating and storing a definition of a data center in a symbolic definition language. The language expresses the logical structure of a data center in a syntactically concise and consistent manner. The language may be used to describe a data center and its internal components such as servers, load balancers, firewalls, etc. The language provides the ability to describe a data center at a high level of abstraction, in terms of its basic building blocks and their interconnectivity via virtual local area networks (VLANs).

In the language, a data center is defined in terms of its devices and their interconnections. Devices are defined in terms of connectivity to other devices, configuration of the devices, and (for only for devices that are CPUs) roles of the devices. Using the language disclosed herein, internal logical structures of a virtual server farm may be instantiated, modified, and duplicated or "cloned." In a preferred embodiment, the symbolic definition language conforms to a grammar of XML and is defined according to XML DTDs.

Generally, the symbolic definition language presents a farm as a structure composed of devices or sets of devices that have both connectivity information as well as configuration related information. The connectivity information describes how the various devices are interconnected by describing how the device ports are connected to specific VLANs. Each VLAN is referenced using symbolic references that are mapped to specific VLANs when the data center is instantiated in a particular segment of a computing grid, e.g., the type of computing grid described by Aziz et al.

The symbolic definition language also provides the ability to describe roles that a server may occupy in a given data center by providing an abstract description of that server. This enables an administrator or a Farm Manager software application to create and deploy multiple instances or clones of that server role in a given data center. As a result, a common recurring task in creating a server farm, e.g., configuring a machine for a particular role, becomes highly automated. A particular configuration (e.g. a web server configuration) may be repeatedly performed on many different servers automatically. The ability to specify a server role once, and then automatically clone it as needed provides a much needed level of automation. Further, server roles facilitate duplicating or cloning entire server farms, which may be useful for creating site mirrors at different geographic locations, or creating a staging area for a future version of a site.

5.2 LANGUAGE DESCRIPTION

In general, entries in a textual representation that conforms to the symbolic definition language are identified by a unique name value inside a type value. Elements defined in the language are subnet, interface, disk, server-role, fixed-server, tier, load balancer, firewall, and device, each of which is now described.

5.2.1 SUBNET DEFINITION

A subnet is defined using an IP address type with an optional netmask value and a vlan value. Multiple subnets may be part of the same vlan. Elements inside a subnet definition include a name value, ip value, mask value, and vlan value. The name value comprises a mandatory unique identifier of the subnet. The ip value is mandatory and may have one of two possible values. The value "internal" is used for any network address that is valid only inside a dataplane. The value "external" is used for any valid IP address visible on the Internet. The mask value is an optional netmask value on the subnet, and defines the maximum number of devices that can be connected on this subnet. The vlan value is a mandatory name identifier.

As an example, the textual representation

<subnet name="inner"ip="internal"vlan="inner-vlan"> is defining an internal subnet bind to the inner vlan. Further, the text <subnet name="outer"ip="external"mask="255.255.255.252"vlan="outer-vlan"> is defining an external subnet bind on the outer vlan with 4 reserved IP address.

5.2.2 INTERFACE DEFINITION

Interfaces are required parts of the definition of all devices attached to a subnet. In an embodiment, there are two ways to provide an interface definition, generic and specific. A generic definition binds the interface to a subnet, and a specific definition gives an IP address value, a netmask value, and a vlan value.

If there is only one Ethernet interface declared, it is always named eth0.

Each generic interface definition comprises a name value and a subnet value. The name value is mandatory and provides a logical identifier of a real hardware interface associated with the device. Examples of logical identifiers are 'eth0' for the first ethernet interface, 'eth1' for the second Ethernet interface. The subnet value provides the name of a defined subnet.

As an example, the text <interface name="eth0"subnet="sub1"/> defines the first interface of a device in the sub1 subnet.

A specific definition of a subnet includes a name value, ip value, mask value, and vlan value. The name value has the same value specified above for the generic definition. The ip value is the host IP address for the interface. The mask value is the netmask associated to the IP address. The vlan value is the name of the vlan name where the interface must belong. For example, the text <interface name="ethI"ip="129.157.179.15;"mask="255.255.255.0"vlan="test-vlan"/> defines the second interface of a device with IP address and netmask on test-vlan.

When an IDC is instantiated using such a definition, a DNS entry is configured to map the defined IP address. The rule for DNS name of a device is as follows:

For interface eth0 of the device, the DNS name is <devicename>.<zonename>. For all other interfaces the DNS name is <devicename>-<interfacename>.<zonename>. For example, if a device name is myhttpserver and zone name is farm1.cnet.terraspring.com, then for interface eth0 DNS name will be myhttpserver.ffarm1.cnet.terraspring.com. For interface eth1, DNS name will be myhttpserver-eth1.farm1.cnet.terraspring.com, etc.

5.2.3 DISK DEFINITION

A disk definition is part of the server-role definition. A disk definition comprises a drivename value, drivesize value, and drivetype value. The drivename value is a mandatory, unique name for the disk. The drivesize value is the size of the disk in Megabytes. The drivetype value is the mirroring type for the disk. For example, standard mirroring (specified using the value "std") may be specified.

As a usage example, the text <disk drivename="/test"drivesize=200 drivetype="std"/> defines a 200 Mb disk map on /test.

Automatic processing of storage requests in response to disk tags is described further herein in section 5.7.2.

5.2.4 SERVER ROLE DEFINITION

According to an embodiment, a server role is part of the definition of a fixed server or and server tier. Each server role definition comprises a name value, a diskimage value, a hardware value, and optionally also may include a disk value. The name value is a mandatory value provided to uniquely identify the abstract role involved for servers having the definition. The diskimage value is a mandatory reference to a disk image that is always loaded on servers associated with the role. The hardware (or "hw") value is a mandatory value that provides a hardware type definition associated with the role. The disk value is optional and provides a disk definition for the role.

Table 4 provides an example of a server role definition expressed in the symbolic definition language. This server role definition may form one of the basic elements of a data center.

TABLE 4

SERVER ROLE DEFINITION

```
<server-role name="Solaris2">
    <diskimage> solaris27 </diskimage>
    <hw> cpu-x86 </hw>
</server-role>
```

The example set forth in Table 4 defines Web server role named "Solaris2" and specifies that each computer that is instantiated according to the server role shall have hardware type "cpu-x86" (e.g., a processor from the Intel x86 processor family), and shall use the disk image named "Solaris27." The disk image corresponding to "Solaris27" typically would comprise the Solaris operating system and one or more application programs. For example, the disk image could include a commerce server application, Web server, related scripts, etc. Examples of possible server roles include: Netscape Enterprise Server/Solaris; Microsoft Internet Information Server/NT; Apache/Solaris; Apache/Red Hat Linux; Oracle8i/Solaris; and others. Roles may be specified using a variety of mechanisms. Users or customers of the system can modify and change the contents of disk images over time, enabling instantiation of different kinds of servers. For example, an administrative user or customer of Service Provider 126 can allocate a server, log on to it, customize the server, and invoke a Save Disk Image command using the Customer Control Center to save the customized disk image as a customer-named role.

Significantly, a role description is not tied to any particular instantiation of the role on a particular server in a data center. Various servers or sets of servers (i.e. tiers) may be instantiated using a single role definition. Use of server roles in duplicating server configurations ("cloning" servers) is described further herein in Section 5.3.

5.2.5 FIXED SERVER DEFINITION

A fixed server definition in a Farm Editor Markup Language file defines a unique CPU device. Each fixed server definition comprises one or more interface values, a role value, and one or more specific attribute values. One or more interface values are mandatory and specify interface names for the device. The ole value is a mandatory definition for the role carried out by fixed servers that correspond to the definition.

Table 5 presents an example of a fixed server definition.

TABLE 5

FIXED SERVER ROLE DEFINITION

```
<fixed-server name="bebop">
    <interface name="eth0" subnet="sub1"/>
    <role> Solaris2 </role>
</fixed-server>
```

This definition specifies a fixed server device named "bebop" that has an interface named "eth0," that is located on subnet "sub1," and that is instantiated based on the server role Solaris2.

5.2.6 SERVER TIER DEFINITION

A server tier definition is provided to define an extensible CPU device comprising a logical tier of one or more servers. Each tier definition comprises one or more interface values, a role value, a min-servers value, a max-servers value, and an init-servers value. The interface value is mandatory and specifies an interface name for the tier. The role value is mandatory and provides a definition of the role for the tier. The min-servers value is a mandatory value indicating the minimum number of actual servers for the tier that may exist at any given time. The max-servers value is a mandatory value indicating the maximum number of servers for the tier. The init-servers value is a mandatory value indicating then number of servers that are initialized when the tier is created.

Table 6 provides an example of a server tier definition.

TABLE 6

SERVER TIER DEFINITION

```
<tier name="SolTier">
    <interface name="eth0" subnet="sub1"/>
    <interface name="eth1" subnet="sub2"/>
    <role> Solaris2 </role>
    <min-servers> 5 </min-servers>
    <max-servers> 10 </max-servers>
    <init-servers> 6 </max-servers>
</tier>
```

5.2.7 LOAD BALANCER

A load balancer definition may be provided to define a load balancer device in a server farm or data center. Each load balancer definition includes a definition of a VIP and a list of devices that are to be bound to the VIP. In one embodiment, there is only one VIP entry, but alternative embodiments may comprise multiple VIP entries.

Each VIP definition comprises a name value, either a subnet value or both an IP address value and a mask value, a port value, and one or more bind entry values.

The name value is a mandatory, unique identifier of a vip entry. The values for subnet or IP address and mask provide a mandatory IP definition for the vip entry. The subnet value refers to an existing subnet definition, and in response, the Farm Manager allocates a unique IP address bind on the subnet. The port value is an optional port definition for the load balancer service. In an embodiment, the default port value is 80.

Each bind entry comprises a name value and an optional port value. The name value is a mandatory reference to a name of a tier, fixed server or device. The optional port value provides a port definition on the device of the load balancer service. In an embodiment, the default value is 80.

Table 7A provides an example of a load balancer definition using a subnet definition, and Table 7B provides an example of a definition using an IP value and a mask value.

TABLE 7A

VIP ENTRY DEFINITION

```
<vip name="vip0" subnet="subnet0" port="8081">
    <bind name="WebTier" port="88"/>
    <bind name="lb0:vip0"/>
</vip>
```

TABLE 7B

VIP ENTRY DEFINITION

```
<vip name="vip0" ip="203.135.82.141" mask="255.255.255.0"
port="21">
    <bind name="ftptier" port="21"/>
</vip>
```

In an embodiment, when either of the foregoing definitions are processed and to instantiate a load balancer, a DNS entry for the vip is added according to the format <lbname>-<vipname>.<zone>. For example, if the load balancer name is lb0, the vip name is vip0 and the zone name is farm1.cnet.terraspring.com, then a DNS name for the vip is lb0-vip0.farm1.cnet.terraspring.com.

A load balancer is then defined using a name value, a type value, an interface value, a policy value, and a vip value. The name value is a mandatory unique device name identifier. The type value is a mandatory type of load balancer; in an embodiment, the value "lb" is used. At least one interface value is provided to define an interface name of the load balancer. The policy value provides a mandatory definition of the load balancer policy. Example values include round-robin, least-conn, weighted, etc. The vip value specifies a virtual IP address for the load balance. In one embodiment, one vip value is provided; in an alternative embodiment, multiple vip values may be specified.

Table 7C provides an example of a load balancer definition.

TABLE 7C

LOAD BALANCER DEFINITION

```
<lb name="lb0" type="lb">
    <interface name="eth0" subnet="internet"/>
    <interface name="eth1" subnet="sub1"/>
    <policy> round-robin </policy>
    <vip name="vip0" subnet="internet" port="8081">
        <bind name="WebTier"/>
        <bind name="bebop" port="8081"/>
    </vip>
</lb>
```

5.2.8 FIREWALL DEFINITION

A FML document may comprise one or more firewall definitions that provide specifications for firewall devices. Each firewall definition comprises a name value, type value, out-interface value, in-interface value, and zero or more fw-interface values. The name value is mandatory and provides a unique device name identifier. The type value is mandatory and indicates the type of firewall. In one embodiment, "fw" is the type value. The out-interface value is mandatory and indicates an outside interface of the firewall. Similarly, the in-interface value specifies an inside interface of the firewall. The optional fw-interface value provides a reference to a separate firewall interface definition.

Each of the interface definitions within a firewall definition (out-interface, in-interface, and possibly fw-interface) comprises an interface value, zero or more allow values, and zero or more deny values. The interface value consists of a name of the interface. The allow value is a list of services to which access is allowed through the interface, and can contain zero or more service definitions. The in-interface is a list of denied services, and also can contain zero or more service definitions. Access to these services will be denied from this interface.

A service is defined by a sequence number value, name value, protocol value, port value, from value, and to value. The sequence number value gives the order in which the service is applied to the firewall interface, as illustrated by the example below. The name value provides the name of the service; examples include http, ftp, myhttp, etc. Alternatively, the name value "all" may be specified if all services are allowed or denied. The protocol value specifies the protocol of the service, e.g., tcp, udp, icmp, etc. If the service name is a standard service as specified in Table 8B herein or is specified as "all," then a protocol value need not be provided. The port value specifies the port for the service, e.g., 80, 21. If a service is not associated with a port value, e.g., ping or "all", then the port value may be omitted.

The "from" value provides a list of one or more IP values to which this service will be allowed or denied. A from element consists of either a name value, or an IP address and mask value. The name attribute can be used to allow or deny access to hosts on the in/dmz side. For example, 1. The value <from ip="192.0.0.0"mask="255.0.0.0"> win allow or deny a service to hosts coming from the domain 192.0.0.0/255.0.0.0.

2. The definition <from ip="0.0.0.0"mask="0.0.0.0"> will allow or deny a service request coming from any host.

3. The definition <from name="ftpServer:eth0"> will allow/deny a service request coming from hostftpServer's ip set on interface eth0.

4. The definition <from name="inside"/> definition will allow/deny a service to all hosts coming from the inside of the firewall, where "inside" is the name of the in-interface of the firewall.

5. The definition <from name="dmz1"/> will allow/deny a service to all hosts coming from the dmz side of the firewall, where "dnz1" is the name of the fw-interface of the firewall.

6. The definition <from name="all"/> definition will allow/deny a service coming from any host. The definitions <from name="all"> and <from ip="0.0.0.0" mask="0.0.0.0"> are equivalent.

The "to" value provides a list of one or more hosts for which a service is allowed or denied. A "to" element consists of either-a name value, or an IF value and mask value. The to element in combination with an ip value and mask definition can be used to allow or deny internal hosts to some external ip domain. Some example definitions are given below:

1. The definition <to name="mylb:vip0"/> will allow or deny a service to load balancer mylb's vip vip0.

2. The definition <to ip="180.10.1.0" mask="255.255.255.0 "/> will allow/deny a service to ip domain 180.10.1.0/255.255.255.0.

3. The definition <to name="ws1:eth0"/> will allow or deny a service to host ws1's ip set on interface eth0.

4. The definition <to name="inside"/> will allow or deny a service to all hosts on the inside of the firewall, where "inside" is the name of the in-interface of the firewall.

5. The definition <to name="dmz1"/> definition allow or deny a service to all hosts on the dmz side of the firewall, where "dmz1" is the name of the fw-interface of the firewall.

6. The definition <to name="all"/> definition will allow or deny a service to all hosts on all side of the firewall.

Table 8A provides an example of a complete firewall definition according to the foregoing language definitions.

TABLE 8A

FIREWALL DEFINITION

```
<fw name="fw1" type="fw">
    <out_interface name="outside">
        <interface name="eth0" subnet="Node0"/>
        <allow>
            <service seq="2" name="http">
                <from ip="192.168.1.0"mask="255.255.255.0"/>
                    <to name="ws1:eth0"/>
                    <to name="lb1:vip0"/>
            </service>
            <service seq="3" name="ping"
            protocol="icmp">
                <from ip="0.0.0.0" mask="0.0.0.0"/>
                <to name="dmz1"/>
                <to name="inside"/>
            </service>
```

TABLE 8A-continued

FIREWALL DEFINITION

```
    </allow>
    <deny>
        <service seq="1" name="all">
            <from ip="all" mask="all"/>
                <to name="all"/>
        </service>
    </deny
</out__interface>
<in__interface name="inside">
    <interface name="eth1" subnet="Node1"/>
    <allow>
        <service seq="1" name="smtp">
            <from name=" inside"/>
                <to name="mailServer:eth0"/>
                <--! This mailServer exists on dmz side -->
```

TABLE 8A-continued

FIREWALL DEFINITION

```
            </service>
        </allow>
    </in__interface>
    <fw__interface name="dmz1">
        <interface name="eth2" subnet="Node2"/>
    </fw__interface>
</fw>
```

In the service definition for a firewall device, the name of the service may be either a standard service or a user-defined service. According to an example embodiment, standard services having the names set forth in Table 8B are defined.

TABLE 8B

STANDARD SERVICE NAMES

| Name | Value | Description |
|---|---|---|
| bgp | 179 | Border Gateway Protocol as specified in RFC 1163 |
| biff | 512 | Used by mail system to notify users that new mail is received |
| bootpc | 68 | Bootstrap Protocol Client |
| bootps | 67 | Bootstrap Protocol Server |
| chargen | 19 | Character Generator |
| cmd | 514 | Similar to exec, but has automatic authentication |
| daytime | 13 | Day time as specified in RFC 867 |
| discard | 9 | Discard |
| domain | 53 | DNS (Domain Name System) |
| dnsix | 195 | DNSIX Session Management Module Audit Redirector |
| echo | 7 | Echo |
| exec | 512 | Remote process execution |
| finger | 79 | Finger |
| ftp | 21 | File Transfer Protocol (control port) |
| ftp-data | 20 | File Transfer Protocol (data port) |
| gopher | 70 | Gopher |
| hostname | 101 | NIC Host Name Server |
| nameserver | 42 | Host Name Server |
| ident | 113 | Ident authentication service |
| irc | 194 | Internet Relay Chat protocol |
| isakmp | 500 | ISAKMP |
| klogin | 543 | KLOGIN |
| kshell | 544 | Korn Shell |
| lpd | 515 | Line Printer Daemon - printer spooler |
| login | 513 | Remote login |
| mobile-ip | 434 | MobileIP-Agent |
| netbios-ns | 137 | NETBIOS Name Service |
| netbios-dgm | 138 | NETBIOS Datagram Service |
| nntp | 119 | Network News Transfer Protocol |
| ntp | 123 | Network Time Protocol |
| pim-auto-rp | 496 | Protocol Independent Multicast, reverse path flooding, dense mode |
| pop2 | 109 | Post Office Protocol - Version 2 |
| pop3 | 110 | Post Office Protocol - Version 3 |
| radius | 1645, 1646 | Remote Authentication Dial-In User Service |
| rip | 520 | Routing Information Protocol |
| smtp | 25 | Simple Mail Transport Protocol |
| snmp | 161 | Simple Network Management Protocol |
| snmptrap | 162 | Simple Network Management Protocol - Trap |
| sqlnet | 1521 | Structured Query Language Network |
| sunrpc | 111 | Sun RPC (Remote Procedure Call) |
| syslog | 514 | System Log |
| tacacs | 49 | TACACS+ (Terminal Access Controller Access Control System Plus) |
| talk | 517 | Talk |
| telnet | 23 | Telnet as specified in RFC 854 |
| Tftp | 69 | Trivial File Transfer Protocol |
| time | 37 | Time |
| uucp | 540 | UNIX-to-UNIX Copy Program |
| Who | 513 | Who |
| whois | 43 | Who Is |

TABLE 8B-continued

STANDARD SERVICE NAMES

| Name | Value | Description |
|---|---|---|
| www | 80 | World Wide Web |
| xdmcp | 177 | X Display Manager Control Protocol, used to communicate between X terminals and workstations running UNIX |

If a service is a standard service, a definition may provide only the name of the service. For example:

<service seq="1" name="ftp">. . . . . .

</service>

If a service is a user-defined service, then values for service name, protocol and port are require. For example:

<service seq="2"name="myhttp"protocol="tcp"port="8080">. . . . . . <service>

The protocol value may be a literal value as specified in below, or it may be a valid protocol number from 0–255. Table 8C presents literal names that can be used, in one example embodiment, instead of a numerical protocol values.

TABLE 8C

LITERAL NAMES AND PROTOCOL VALUES

| Literal | Value | Description |
|---|---|---|
| ah | 51 | Authentication Header for IPv6, as specified in RFC 1826 |
| eigrp | 88 | Enhanced Interior Gateway Routing Protocol |
| esp | 50 | Encapsulated Security Payload for IPv6, as specified in RFC 1827 |
| gre | 47 | General Routing Encapsulation |
| icmp | 1 | Internet Control Message Protocol, as specified in RFC 792 |
| igmp | 2 | Internet Group Management Protocol, as specified in RFC 1112 |
| igrp | 9 | Interior Gateway Routing Protocol |
| ipinip | 4 | IP-in-IP encapsulation |
| nos | 94 | Network Operating System (Novell's NetWare) |
| ospf | 89 | Open Shortest Path First routing protocol, as specified in RFC 1247 |
| pcp | 108 | Payload Compression Protocol |
| snp | 109 | Sitara Networks Protocol |
| tcp | 6 | Transmission Control Protocol, as specified in RFC 793 |
| udp | 17 | User Datagram Protocol, as specified in RFC 768 |

Other protocol numbers as specified by the Internet Assigned Numbers Authority, and corresponding names, can be supported.

5.2.9 DEVICE DEFINITION

A farm definition may include one or more device definitions. Each device definition is a generic for any type of device, and comprises a name value, a type value, one or more interface values, and one or more attribute values. The name value provides a unique identifier for the device definition. The type value provides a value indicating the type of the device. In an embodiment, one of the device type values defined in Wireless Markup Language (WML) is used. The interface value identifies an interface name for the device. For example, a device definition may comprise:

<device name="cam0"type="webcam"><interface name="eth0"subnet="inner"/>

</device>

5.3 SERVER CLONING

A recurring task often encountered in creating a server farm is configuring a machine for a particular role. For example, a machine may be configured as a Web server, database server, etc. The configuration then is repeatedly performed on many different servers manually to build up tiers or arrays of servers. The ability to specify a server role once, and then automatically clone it as needed, as disclosed herein, provides a much-needed level of automation.

Role definitions have several aspects. For example, a role definition may include a description of the hardware, operating system, any patches for the operating system, and a set of applications to be loaded on a server. In addition, a role may also describe what kinds of network resources need to be accessible to a class of servers. Examples of this include having network file access (e.g. NFS or CIFS) to a set of network file servers, or database access to a set of database servers. Once a role is specified in these terms, a disk-to-disk copy, followed by any per-server customization, clones a server with the role.

In one embodiment, for dynamically cloned servers, DHCP is used for IP address assignment by default, so that no customization is needed for purposes of specifying the local IP address. Given this, the majority of role cloning can be accomplished simply by a disk-to-disk copy on the storage area network (SAN) associated with a given server farm.

Certain application-specific clustering mechanisms require the use of statically assigned IP addresses. These are supported by defining a tier of servers that has a range of IP addresses associated with it; upon instantiation and at runtime, the Farm Manager brings servers into and out of the fixed range of IP addresses.

Table 4 provides one example of a server role definition, and Table 9 provides another example which will be more fully described herein.

TABLE 9

SERVER ROLE DEFINITION

```
<server-role name="NTWebServer">
    <diskimage> NT_IIS </diskimage>
    <hw> cpu-x86 </hw>
</server-role>
```

The example in Table 10 defines a server role named "NTWebServer." Each server instantiated according to this server role will comprise a processor from the x86 processor family, with Windows NT as the operating system, and Microsoft Internet Information Server (IIS) as a Web server application, as indicated by the disk image specification of "NT_IIS." The role name value refers to a predefined web server role that consists of an NT boot disk image, containing IIS 3.0 and an x86 Front End Processor as the hardware. These roles consist of a union of a predefined set that is present at Segment Installation time and a customer defined set that can grow over time for each customer.

Server roles may be specified using a variety of mechanisms. The customer can allocate a server and log on to it. This server can be customized by the customer and that customized disk image can be saved as a customer named role.

Significantly, a role description is not tied to any particular instantiation of the role on a particular server in a data center. Various servers or sets of servers (i.e. tiers) may be instantiated using a single role definition.

5.4 EXAMPLE COMPLETE SERVER FARM DESCRIPTIONS

A virtual server farm or instant data center may be defined by specifying that computing elements in the data center conform to one or more of the server roles that are defined as described above. A typical data center may comprise a load balancing device, and a tier of one or more web servers, one or more of which have access to a fixed file server or database server. Generally, a data center description first provides connectivity information, in terms of port to VLAN mappings for each device in the data center, and then provides device specific configuration information.

In each data center definition, a special logical VLAN, referred to as the “outer-vlan,” is defined. The “outer-vlan” is a symbolic reference to a VLAN that is associated with the outside of the data center for a specific instantiation of the data center at a Grid Segment. It is used as an anchor point for the data center description. The “outer-vlan” also is the point of entry vlan for inbound IP traffic for a data center. Other VLANs are also referred to symbolically in the connectivity information. At a particular Grid Segment, the Administration/Management Server 130 will map each logical VLAN (including the “outer-vlan”) to specific VLANs that it allocates from among available VLANs of that Grid Segment. The “outer-vlan” can be unique to each customer or end user.

Each VLAN identifier is always mapped to the same VLAN number of a given Grid Segment. Where the system of FIG. 1 serves multiple customers, each of whom has one or more server farms defined, the VLAN numbers are the same on a per customer basis. In particular, if the same VLAN string identifier is used in a single FML description, then it is mapped to the same VLAN number. However, if the same VLAN string identifier is used in multiple descriptions of different data centers, then the same VLAN string identifier is mapped to different VLAN numbers of the same switch fabric.

5.4.1 EXAMPLE TWO-TIER SERVER FARM

Table 10 illustrates a simplified example of a textual representation of a data center that defines only one class of Web servers, and the file and database server that is used by the Web servers.

TABLE 10

EXAMPLE DATA CENTER DEFINITION

```
<farm name=”My-2-Tier-Farm”, fmlversion=”1.0”>
<subnet name=”outer” ip=”external” vlan=”outer-vlan”>
</subnet>
<subnet name=”inner” ip=”internal” vlan=”inner-vlan”>
</subnet>
<!--
! put db on a separate vlan to hide traffic.
-->
<subnet name=”db” ip=”internal” vlan=”db-vlan”>
</subnet>
<lb name=”lb1” type=”lb”>
    <interface name=”eth0” subnet=”outer”/>
    <interface name=”eth1” subnet=”inner”/>
    <policy> round-robin </policy>
    <vip name=”vip0” subnet=”outer” port=”8080”>
        <bind name=”WebTier” port=”8080”/>
    </vip>
</lb>
<server-role name=”WebServer”>
```

TABLE 10-continued

EXAMPLE DATA CENTER DEFINITION

```
    <diskimage> NT_IIS </diskimage>
    <hw> cpu-x86 </hw>
</server-role>
<server-role name=”OracleServer”>
    <diskimage> Solaris_Oracle </diskimage>
    <hw> cpu-sun4u </hw>
    <diskdrive name=”/oracle” drivesize=”4048”/>
</server-role>
<server-role name=”FileServer”>
    <diskimage> Solaris </diskimage>
    <hw> cpu-sun4u </hw>
    <disk drivename=”/export” drivesize=”1024”/>
</server-role>
<tier name=”WebTier”>
    <interface name=”eth0” subnet=”inner”/>
    <interface name=”eth1” subnet=”db”/>
    <role> Webserver </role>
    <min-servers> 5 </min-servers>
    <max-servers> 20 </max-servers>
    <init-servers> 10 </init-servers>
</tier>
<fixed-server name=”OracleServer”>
    <interface name=”eth0” subnet=”db”>
    <role> OracleServer</role>
</fixed-server>
<fixed-server name=”bebop”>
    <interface name=”eth0” subnet=”db”/>
    <role> FileServer </role>
</fixed-server>
</farm>
```

Figure 5:
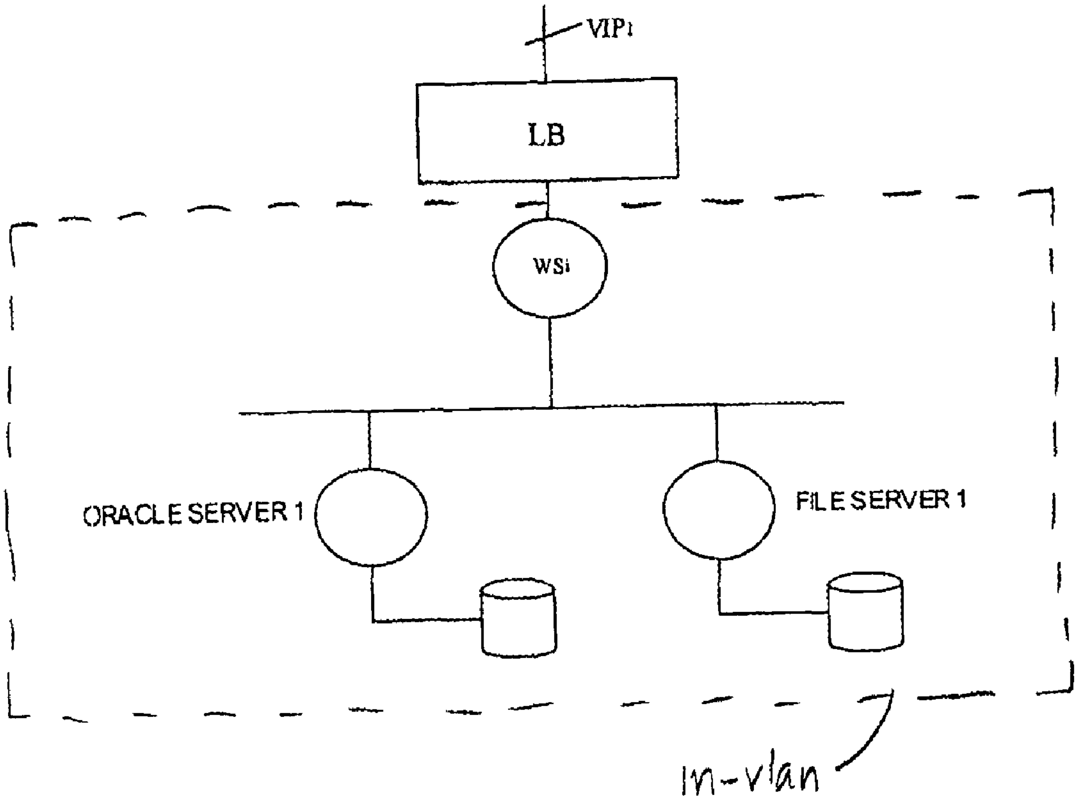
FIG. 5 is a block diagram of an example two-tier server farm.

FIG. 5 is a block diagram of a data center that corresponds to the definition of Table 10. FIG. 5 and Table 10 present an example of a 2-tier server farm, with a dynamically scaled web server tier and a round robin load balancing policy that is implemented by load balancer LB. Block WSi represents a tier of one or more Web servers, each of which is a Windows NT/IIS machine. The data center contains two statically assigned servers, a file server called FileServer1 and a database server called OracleServer1. There are two VLANs in this description, the outer-vlan as described above and the in-vlan. All devices other than the load-balancer are on the in-vlan.

In a manner similar to the way that the web server role is defined above, an application server role may be defined as follows:

<server-rolename=”weblogic appserver><role>”NT__WL”</role><hw>”cpu-x86”</hw>
<’server-role>

In this case the application server is a WebLogic 4.5 server running on a x86 NT 4.0 platform. It has access to the same network accessible files and databases as the Web server role defined earlier herein.

5.4.2 THREE-TIER SERVER FARM EXAMPLE

Using this definition of an application server, a 3-tier server farm may be defined as set forth in Table 11:

TABLE 11

EXAMPLE THREE-TIER SERVER FARM

```
<farm name=”My-3-Tier-Farm”, fmlversion=”1.0”>
<subnet name=”outer” ip=”external” vlan=”outer-vlan”>
</subnet>
<subnet name=”inner” ip=”internal” vlan=”inner-vlan”>
</subnet>
<subnet name=”db” ip=”internal” vlan=”db-vlan”>
</subnet>
<server-role name=”WebServer”>
```

TABLE 11-continued

EXAMPLE THREE-TIER SERVER FARM

```
        <diskimage>NT__IIS </diskimage>
        <hw> cpu-x86 </hw>
    </server-role>
    <server-role name=”WeblogicAppServer”>
        <diskimage> NT__WL </diskimage>
        <hw> cpu-x86 </hw>
    </server-role>
    <server-role name=”OracleServer”>
        <diskimage> Solaris_Oracle </diskimage>
        <hw> cpu-sun4u </hw>
        <disk drivename=”/oracle” drivesize=”4048”/>
    </server-role>
    <server-role name=”FileServer”>
        <diskimage> Solaris </diskimage>
        <hw> cpu-sun4u </hw>
        <disk drivename=”/export” drivesize=”1024”/>
    </server-role>
    <lb name=”lb1” type=”lb”>
        <interface name=”eth0” subnet=”outer”/>
        <interface name=”eth1” subnet=”inner”/>
        <policy> round-robin </policy>
        <vip name=”vip0” ip=”129.157.179.15”
        mask=”255.255.255.0” port=”8080”>
            <bind name=”WebTier” port=”8081”/>
        </vip>
    </lb>
    <tier name=”WebTier”>
        <interface name=”eth0” subnet=”inner”/>
        <role> Webserver </role>
        <min-servers> 5 </min-servers>
        <max-servers> 20 </max-servers>
        <init-servers> 10 </init-servers>
    </tier>
    <lb name=”lb2” type=”lb”>
        <interface name=”eth0” subnet=”inner”/>
        <interface name=”eth1” subnet=”inner”/>
        <policy> round-robin </policy>
        <vip name=”vip0” ip=”129.157.179.16”
        mask=”255.255.255.0” port=”8080”>
            <bind name=”AppTier” port=”8081”/>
        </vip>
    </lb>
    <tier name=”AppTier”>
        <interface name=”eth0” subnet=”inner”/>
        <interface name=”eth1” subnet=”db”/>
        <role> WeblogicAppServer </role>
        <min-servers> 8 </min-servers>
        <max-servers> 20 </max-servers>
        <init-servers> 10 </init-servers>
    </tier>
    <fixed-server name=”OracleServer”>
        <interface name=”eth0” subnet=”db”>
        <role> OracleServer </role>
    </fixed-server>
    <fixed-server name=”bebop”>
        <interface name=”eth0” subnet=”db”/>
        <role> FileServer </role>
    </fixed-server>
    </farm>
```

In the example of Table 11, in order to configure the web server, the application tier will need to be created first, so that its VIP can be configured as part of the WebLogic plug-in configuration on the web server.

Figure 6:
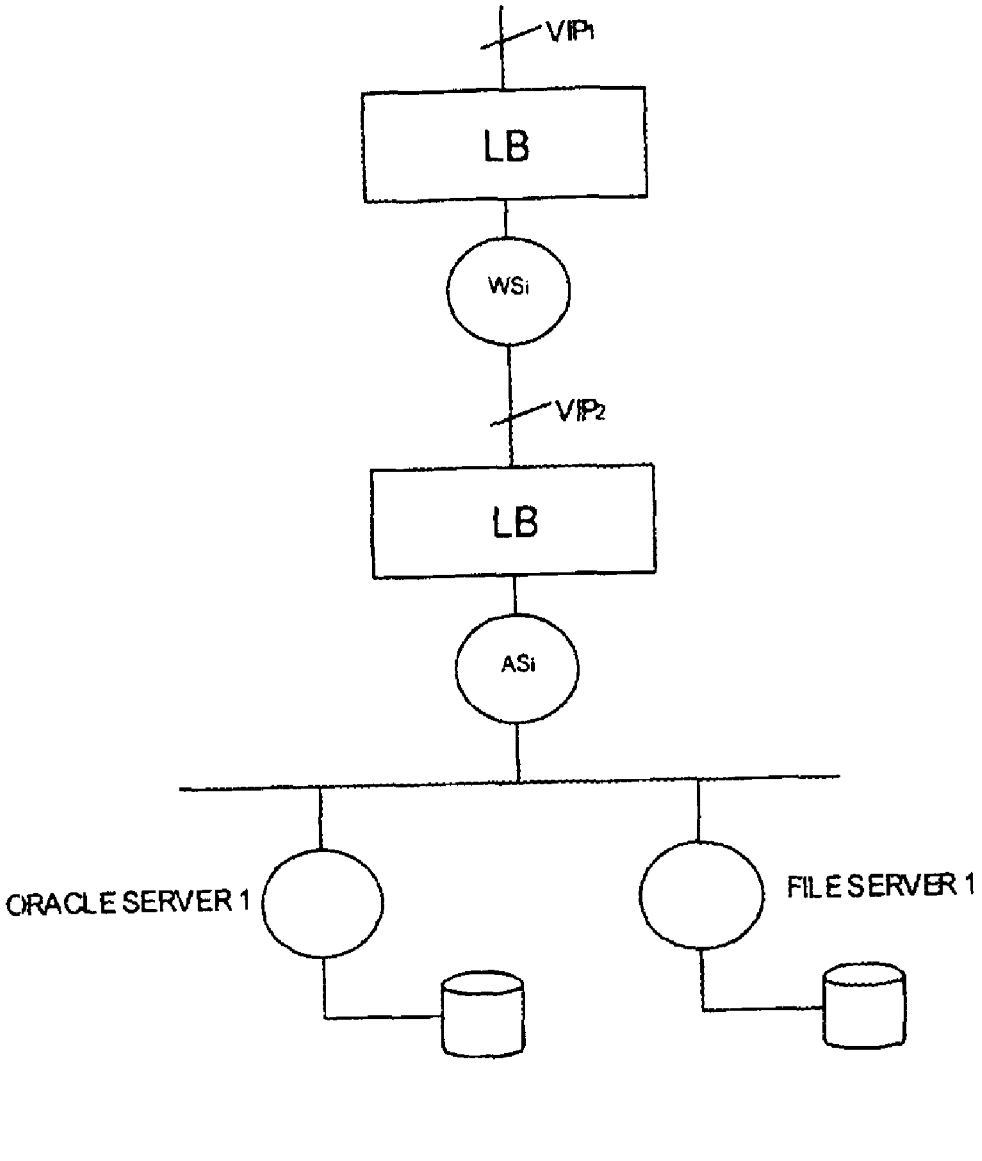
FIG. 6 is a block diagram of an example three-tier server farm.

FIG. 6 is a block diagram of a data center corresponding to the textual representation set forth in Table 11.

5.5 FARM MONITORING

In addition to the construction of farms, FML describes any monitoring of the elements in the firm that automatically take place. In one embodiment, this monitoring functionality is to provide for the automatic flexing of a farm. Alternatively, monitoring functions may be used only to alert operations personnel or a user or customer of conditions in the farm.

5.6 FARM CLONING

Since an entire server farm may be described logically, without any hard-coded reference to information that is specific to a Grid Segment, e.g., IP addresses, etc., an entire server farm definition can be cloned, resulting in creation and activation of one or more duplicate server farms. The ability to reuse the logical structure of a data center, to create a farm clone or to use as a starting point for another data center, is a powerful and useful capability.

Since each data center definition implies the use of IP addresses internal to the data center, cloning a data center requires the ability to abstract out such data center-specific information. In one approach, this is accomplished by referring to all data center-specific variables using external entity declarations, or using the “vfstab” approach described below. Each external entity declaration contains a reference to a file that contains the data center-specific information. Each Farm Manager that is responsible for a given IDC creates IDC-specific files containing IP addresses for the File servers and database servers. This removes any dependencies in the XML notation from specific variable values, such as the IP addresses of the various fixed servers. Examples of the external entity references in the data center descriptions above are the references “&VIP1” and “&VIP 2.” In a real FML file, these references would refer to external files containing the segment specific IP addresses associated with the VIPs.

An alternative approach using “vfstab” files is also contemplated. In this alternative, relative DNS names are created and stored in the “vfstab” configuration file for all elements and applications that are defined as part of a virtual server farm. Further, the DNS server and DHCP server associated with the virtual server farm is provided with a default domain. As a result, the network addresses of cloned server farms can be automatically resolved in response to instructions from the Farm Manager to the DNS server and DHCP server.

Alternatively, IP addresses are left blank in FML files and assigned dynamically by the Farm Manager.

The cloning capability described herein may be used as part of the graphical user interface tool that is described herein. In particular, the graphical user interface tool may allow reuse of already defined data centers as input to other data centers that may be instantiated at different Grid Segments. For example, the graphical user interface tool may implement duplication of data centers by enable a user to drag an icon representing a data center from one location in a workspace and drop the icon in another location of the workspace.

5.7 EXAMPLE TEXTUAL REPRESENTATIONS OF DATA CENTERS OR SERVER FARMS

5.7.1 USE OF FIREWALL IN A SERVER FARM

FIG. 7 is a block diagram of an example of a visual representation of a server farm that illustrates how the markup language may be used to establish a two-tier server farm featuring a firewall.

In addition to servers and load-balancers, server farms often include a firewall device, which selectively permits or denies access to services within the server farm, and can control access to VPNs provided through the firewall. In order to describe firewalls as components of various server farms, the Firewall DTD is provided as part of the FML. The firewall DTD permits simple specification of the firewall attributes, such as Firewall type, the services to permit and/or deny, De-Militarized Zone (DMZ) services, and any VPN associations that the firewall may need to be configured with.

Referring now to FIG. 7, an example of a firewall configured with a set of DMZ services is shown. A two-tier server farm 700 generally comprises a network connection 701, an outer virtual local area network (VLAN) 710 and an inner VLAN 720. Network connection 701 is coupled to one or more internetworks such as the global, packet-switched network of networks known as the Internet. Data arriving at server farm 700 from the network connection 701 is coupled to firewall 702, which provides security functions. Data from firewall 702 is coupled to a load balancer 704, which distributes service requests among one or more server nodes 706. In this example, assume that each of the server nodes 706 is a computer acting as a Web server. Ports P1, P2, P3, and P4 are on VLAN 710.

In addition, VLAN 720 may include one or more fixed server nodes. For example, one of the server nodes 706 may be coupled to a database server 708 and associated storage 709.

Table 12 presents an example of a symbolic representation of server farm 700.

TABLE 12

SYMBOLIC REPRESENTATION OF EXAMPLE SERVER FARM

```
<farm name="My-2-Tier-Farm", fmlversion="1.0">
<subnet name="outer" ip="external" vlan="outer-vlan">
</subnet>
<subnet name="inner" ip="internal" vlan="inner-vlan">
</subnet>
<subnet name="dmz" ip="internal" vlan="dmz-vlan">
</subnet>
<!--
! put db on a separate vlan to hide traffic.
-->
<subnet name="db" ip="internal" vlan="db-vlan">
</subnet>
<fw name="fw1" type="fw">
    <out_interface name="outside">
    <interface name="eth0" subnet="outer"/>
    <allow>
            <service seq="1" name="http">
                <from ip="192.168.1.0" mask="255.255.255.0"/>
            <to name="ws1:eth0"/>
        <to name="lb1:vip0"/>
            </service>
    </out_interface>
    <in_interface name="inside">
    <interface name="eth1" subnet="inner"/>
    </in_interface>
    <fw_interface name="dmz1">
        <interface name="eth2" subnet="dmz"/>
    </fw_interface>
</fw>
<lb name="lb1" type="lb">
    <interface name="eth0" subnet="inner"/>
    <policy> round-robin </policy>
    <vip name="vip0" subnet="inner" port="8080">
        <bind name="WebTier" port="8080"/>
    </vip>
</lb>
<server-role name="WebServer">
    <diskimage> NT_IIS </diskimage>
    <hw> cpu-x86 </hw>
</server-role>
<server-role name="OracleServer">
    <diskimage> Solaris_Oracle </diskimage>
    <hw> cpu-sun4u </hw>
    <disk drivename="/oracle" drivesize="4048"/>
</server-role>
<server-role name="FileServer">
    <diskimage> Solaris </diskimage>
    <hw> cpu-sun4u </hw>
    <disk drivename="/export" drivesize="1024"/>
</server-role>
<tier name="WebTier">
```

TABLE 12-continued

SYMBOLIC REPRESENTATION OF EXAMPLE SERVER FARM

```
    <interface name="eth0" subnet="inner"/>
    <interface name="eth1" subnet="db"/>
    <role> Webserver </role>
    <min-servers> 5 </min-servers>
    <max-servers> 20 </max-servers>
    <init-servers> 10 </init-servers>
</tier>
<fixed-server name="OracleServer">
    <interface name="eth0" subnet="db">
    <role> OracleServer</role>
</fixed-server>
<fixed-server name="bebop">
    <interface name="eth0" subnet="db"/>
    <role> FileServer </role>
</fixed-server>
</farm>
```

5.7.2 SPECIFYING EXTRA LOCAL DRIVES

Another use of the language defined herein is to specify an extra local storage drive (e.g., a D: drive) as part of a Windows or Solaris machine. This is done using the optional disk attribute of a server definition. For example, the following element in a server definition specifies a server with a local drive named d: with a capacity of 200 MB.

<disk drivename="D:", drivesize="200"></disk>

Although the drive name "D:" is given in the foregoing definition, for the purpose of illustrating a specific example, use of such a name format is not required. The drivename value may specify a SCSI drive name value or a drive name in any other appropriate format. In a Solaris/Linux environment, the disk attribute can be used to specify, e.g. an extra locally mounted file system, such as /home, as follows:

<disk drivename="/home", drivesize="512"></disk>

In carrying out this definition, the Farm Manager allocates the correct disk space on a SAN-attached device and maps the space to the right machine using the processes described herein. Multiple disk attributes can be used to specify additional drives (or partitions from the point of view of Unix operating environments).

The disk element may also include one or more optional attributes for specifying parameters such as RAID levels, and backup policies, using the attribute element. Examples of the attribute names and values are given below.

<disk drivename="/home", drivesize="512 MB">

<attribute name="raid-level", value="0+1"> attribute name="backup-policy", value="level=0:nightly">

<attribute name="backup-policy", value="level=1:hourly"></disk>

The above specifies that /home should be located on a RAID level 0+1 drive, with a level 0 backup occurring nightly and a level 1 backup occurring every hour. Over time, other attributes may be defined for the disk partition.

Figure 2A:
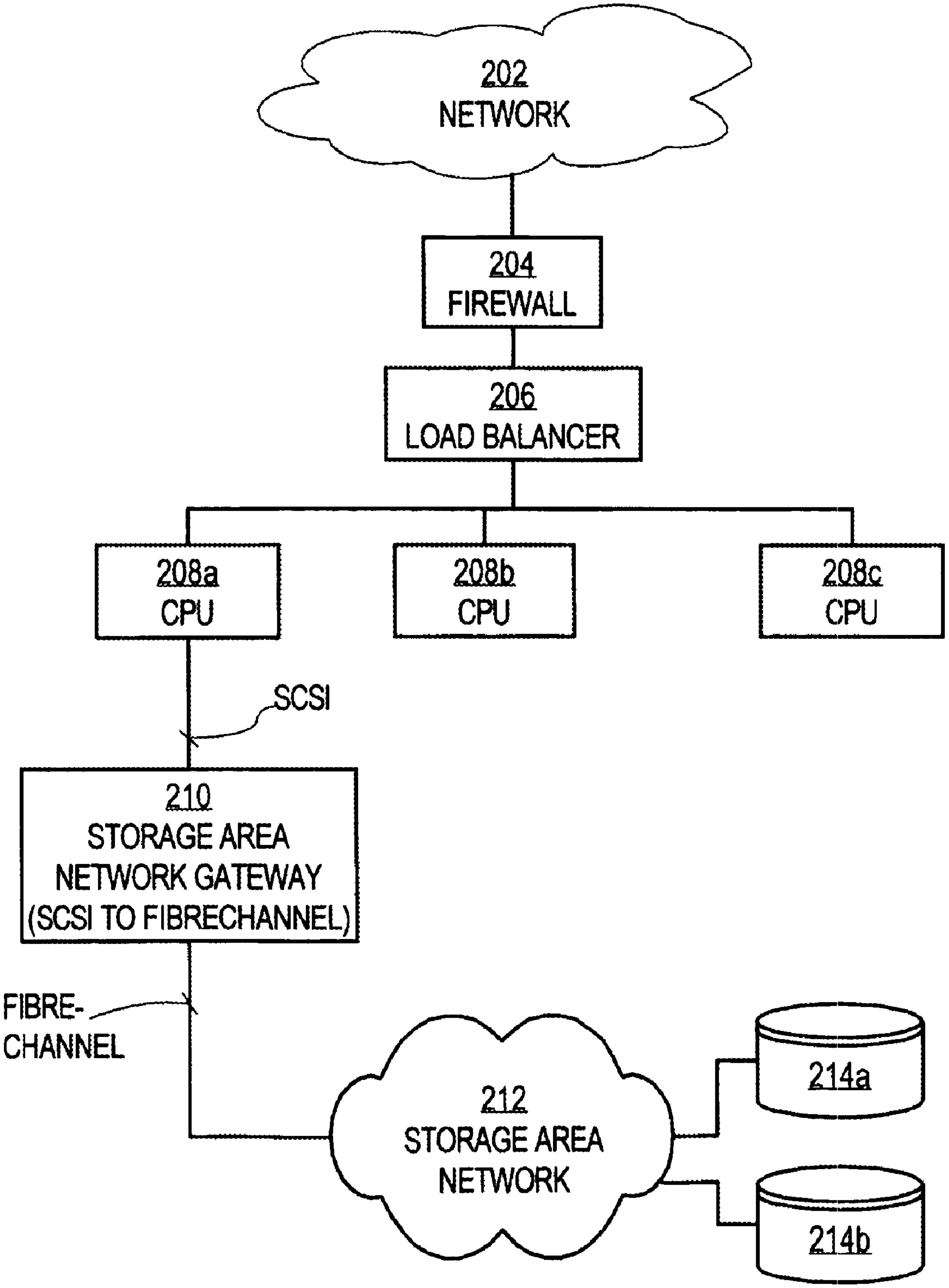
FIG. 2A is a block diagram illustrating a storage area network and related elements.

Embodiments can process disk tags as defined herein and automatically increase or decrease the amount of storage associated with a data center or server farm. FIG. 2A is a block diagram of an example server farm that is used to illustrate an example of the context in which such embodiments may operate. Network 202 is communicatively coupled to firewall 204, which directs authorized traffic from the network to load balancer 206. One or more CPU devices 208*a*, 208*b*, 208*c* are coupled to load balancer 206 and receive client requests from network 202 according to an order or priority determined by the load balancer.

Each CPU in the data center or server farm is associated with storage. For purposes of illustrating a clear example, FIG. 2A shows certain storage elements in simplified form. CPU 208*a* is coupled by a small computer system interface (SCSI) link to a storage area network gateway 210, which provides an interface for CPUs with SCSI ports to storage devices or networks that use fibrechannel interfaces. In one embodiment, gateway 210 is a Pathlight gateway and can connect to 1–6 CPUs. The gateway 210 has an output port that uses fibrechannel signaling and is coupled to storage area network 212. One or more disk arrays 214*a*, 214*b* are coupled to storage area network 212. For example, EMC disk arrays are used.

Although FIG. 2A illustrates a connection of only CPU 208*a* to the gateway 210, in practice all CPUs of the data center or server farm are coupled by SCSI connections to the gateway, and the gateway thereby manages assignment of storage of storage area network 212 and disk arrays 214*a*, 214*b* for all the CPUs.

A system in this configuration may have storage automatically assigned and removed based on an automatic process that maps portions of storage in disk arrays 214*a*, 214*b* to one or more of the CPUs. In an embodiment, the process operates in conjunction with a stored data table that tracks disk volume information. For example, in one embodiment of a table, each row is associated with a logical unit of storage, and has columns that store the logical unit number, size of the logical unit, whether the logical unit is free or in use by a CPU, the disk an-ay on which the logical unit is located, etc.

Figure 2B:
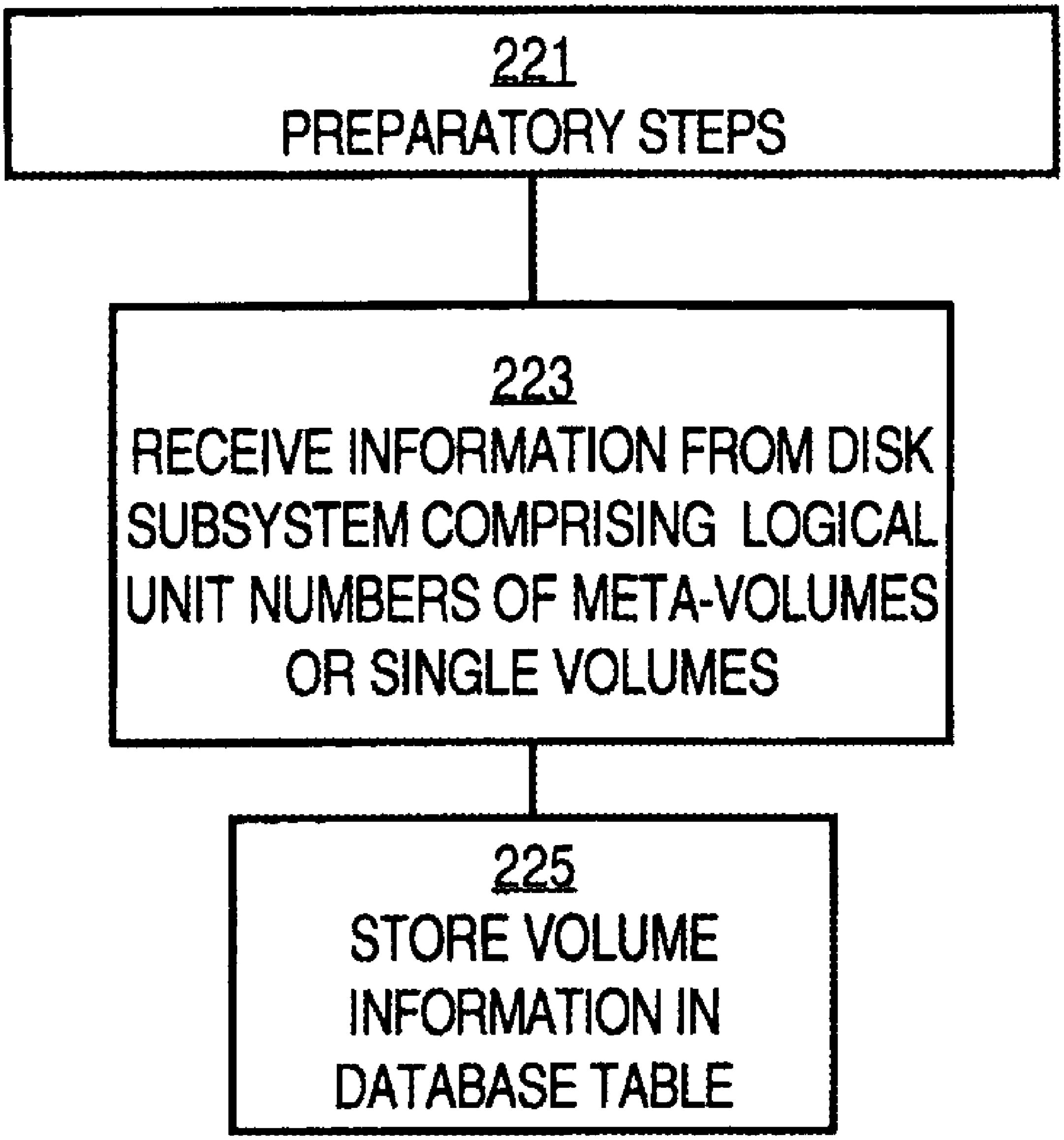
FIG. 2B is a block diagram illustrating preparatory steps for the process of FIG. 2C.

FIG. 2B is a flow diagram that illustrates steps involved in creating such a table. As indicated by block 221, these are preparatory steps that are normally carried out before the process of FIG. 2C. In block 223, information is received from a disk subsystem, comprising one or more logical unit numbers of meta-volumes or single volumes of storage in the disk subsystem. Block 223 may involve receiving unit information from disk arrays 214*a*, 214*b*, or a controller that is associated with them. The information may be retrieved by sending appropriate queries to the controller or arrays. In block 225, the volume information is stored in a table in a database. For example, an Oracle database may contain appropriate tables.

The process of FIG. 2B may be carried out upon initialization of an instant data center, or continuously as one or more data centers are in operation. As a result, the process of FIG. 2C continuously has available to it a picture of the size of available storage in a storage subsystem that serves the CPUs of the server farm.

Figure 2C:
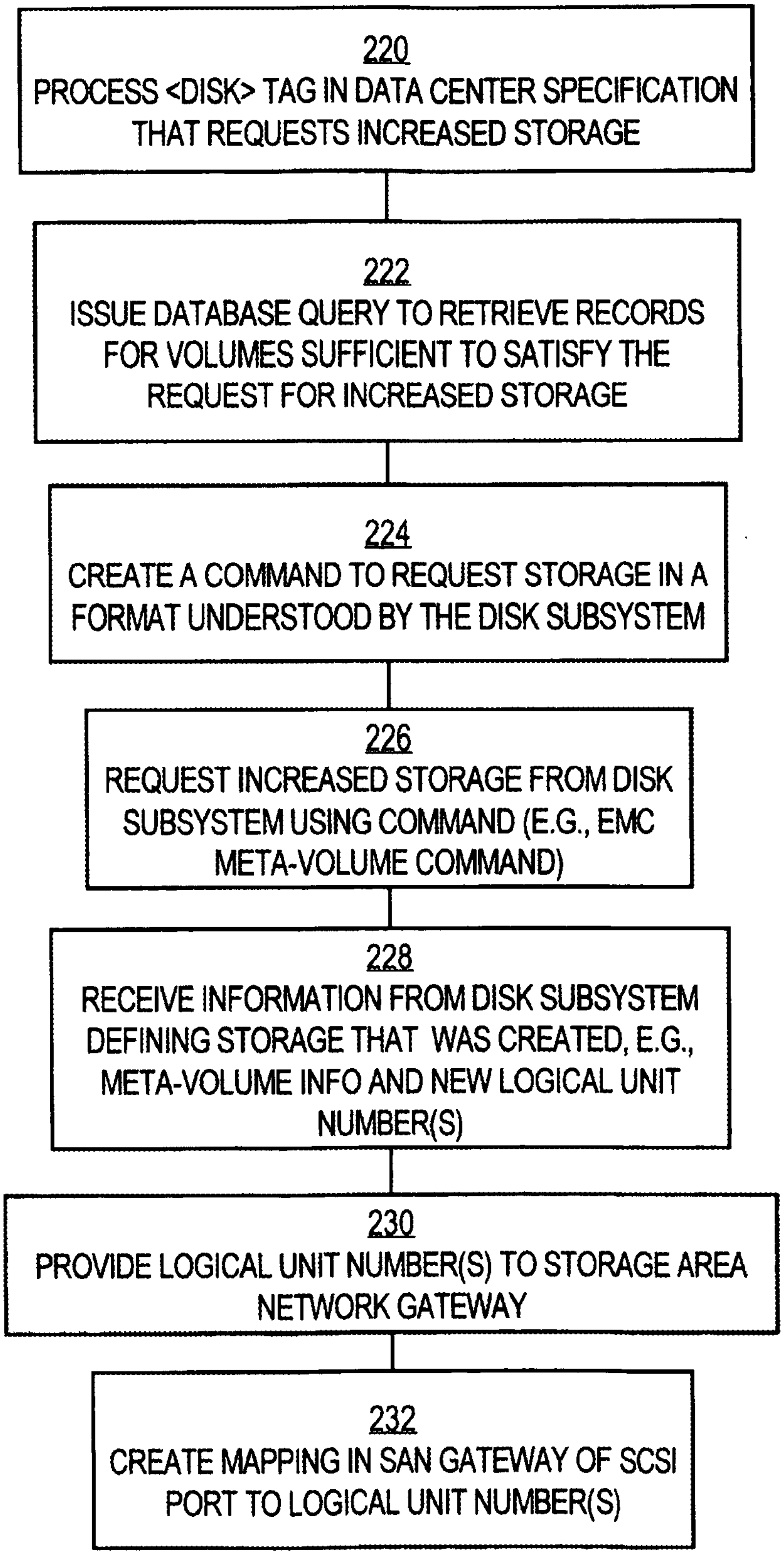
FIG. 2C is a block diagram illustrating a process of automatically modifying storage associated with an instant data center.

FIG. 2C is a block diagram illustrating a process of automatically modifying storage associated with an instant data-center. For purposes of illustrating a clear example, the process of FIG. 2C is described in relation to the context of FIG. 2A, although the process may be used in any other appropriate context.

In block 220, a <disk> tag in a data center specification that requests increased storage is processed. Block 220 may involve parsing a file that specifies a data center or server farm in terms of the markup language described herein, and identifying a statement that requests a change in storage for a server farm.

In block 222, a database query is issued to retrieve records for free storage volume of an amount sufficient to satisfy the request for increased storage that is contained in the data center specification or disk tag. For example, where the disk tag specifies 30 Mb of disk storage, a SELECT query is issued to the database table described above to select and retrieve copies of all records of free volumes that add up to 30 Mb or more of storage. When a result set is received from the database, a command to request that amount of storage in the specified volumes is created, in a format understood by the disk subsystem, as shown by block 224. Where EMC disk storage is used, block 224 may involve formulating a meta-volume command that a particular amount of storage that can satisfy what is requested in the disk tag.

In block 226, a request for increased storage is made to the disk subsystem, using the command that was created in block 224. Thus, block 226 may involve sending a meta-volume command to disk arrays 214*a*, 214*b*. In block 228, the process receives information from the disk subsystem confirming and identifying the amount of storage that was allocated and its location in terms of logical unit numbers. Since meta-volumes may span more than one disk array or disk subsystem, the logical unit numbers may represent storage units in multiple hardware units.

In block 230, the received logical unit numbers are provided to storage area network gateway 210. In response, storage area network gateway 210 creates an internal mapping of one of its SCSI ports to the logical unit numbers that have been received. As a result, the gateway 210 can properly direct information storage and retrieval requests arriving on any of its SCSI ports to the correct disk array and logical unit within a disk subsystem. Further, allocation or assignment of storage to a particular CPU is accomplished automatically, and the amount of storage assigned to a CPU can increase or decrease over time, based on the textual representations that are set forth in a markup language file.

5.7.3 THREE-TIER DATA CENTER

Using this definition of an application server, a 3-tier data center may be defined as set forth in Table 13.

The examples above have used hardware load-balancing exclusively for defining tiers of web or application servers. Application servers such as WebLogic servers can be assembled into tiers without the use of hardware load-balancers. Instead, these servers have application plug-ins into the web server tier that manage load balancing. The plug-in typically consults a configuration file to determine which set of application servers should be considered a single cluster. To accommodate such application-specific mechanisms for adding or deleting nodes from a particular tier, the language defined herein provides the ability to specify custom defined tiers, where there is a provision for farm specific scripts to be invoked on the set of devices in the farm on server add/delete events. These custom defined tiers have special elements that describe the actions to take when a server is added or deleted from that tier.

TABLE 13

THREE-TIER DATA CENTER DEFINITION

```
<farm name=”My-3-Tier-Farm”, fmlversion=”1.0”>
<subnet name=”outer” ip=”external” vlan=”outer-vlan”></subnet>
<subnet name=”inner” ip=”internal” vlan=”iner-vlan”></subnet>
<subnet name=”data” ip=”internal” vlan=”inner-vlan”></subnet>
<lb name=”lb1”>
    <interface name=”eth0” subnet=”outer”/>
    <interface name=”eth1” subnet=”inner”/>
    <policy>round-robin</policy>
    <vip name=”vip0” subnet=”outer” port=”8081”>
        <bind name=”WebTier” port=”8080”/>
    </vip>
</lb>
<server-role name=”WebServer”>
    <diskimage>Solaris_Apache</diskimage>
    <hw> cpu-sun4u </hw>
```

TABLE 13-continued

THREE-TIER DATA CENTER DEFINITION

```
</server-role>
<server-role name=”OracleServer”>
    <diskimage>Solaris_Oracle</diskimage>
    <hw>cpu-sun4u</hw>
</server-role>
<server-role name=”FileServer”>
    <diskimage>Solaris</diskimage>
    <hw>cpu-sun4u</hw>
    <disk drivename=”/export” drivesize=”1024”/>
</server-role>
<tier name=”WebTier”>
    <interface name=”eth0” subnet=”inner”/>
    <interface name=”eth1” subnet=”data”/>
    <role> Webserver </role>
    <min-servers>4</min-servers>
    <max-servers>20</max-servers>
    <init-servers>10</init-servers>
</tier>
<tier name=”AppTier”>
    <interface name=”eth0” subnet=”inner”/>
    <interface name=”eth1” subnet=”data”/>
    <add-action>
        <for-all-in>WebTier</for-all-in>
        <run>
            <name>add-wlserver</name>
            <dir>/Windows/System/IIS</dir>
        </run>
    </add-action>
    <del-action>
        <for-all-in>WebTier</for-all-in>
        <run>
            <name>del-wlserver</name>
            <dir>/Windows/System/IIS</dir>
        </run>
    </del-action>
    <min-servers>4</min-servers>
    <max-servers>20</max-servers>
    <init-servers>10</init-servers>
</tier>
<fixed-server name=”OracleServer”>
    <interface name=”eth0” subnet=”inner”>
    <interface name=”eth1” subnet=”db”>
    <role>OracleServer</role>
<fixed-server>
<fixed-server name=”bebop”>
    <interface name=”eth0” subnet=”inner”/>
    <interface name=”eth1” subnet=”db”/>
    <role> FileServer</role>
</fixed-server>
</farm>
```

In the example of Table 13, in order to configure the Web server, the application tier is created first, so that its VIP can be configured as part of the WebLogic plug-in configuration on the Web server.

In the example above, the code for a tier named AppTier above is an example of a custom defined tier. The code includes specific actions to take when Application Servers are added or deleted from the AppTier. The elements <add-action> and <del-action> specify the actions to take when a server in the associated role is added to or deleted from a data center.

In an embodiment, each associated action is the name of a script that is invoked on the machines specified in the <for-all-in> tag. When a Farm Manager is invoking the scripts on each machine, it expands out the WebTier symbol contained in the <for-all-in> to mean every machine currently existing in the WebTier tier. Each script is invoked by the Farm Manager with the name and IP address of the machine that has just been added to or deleted from the server farm. The scripts can use this information to update any necessary configuration files associated with the addition or deletion of servers in the associated role.

Each script can be customized for each particular data center. For example, for a WebLogic Application Server Tier, the scripts can add/delete the names of the servers from the Internet Information Server WebLogic plug-in configuration files on all web servers that are part of the web server tier. Thus, the “<for-all-in>” tag essentially specifies what to do for an entire tier. It may be followed by a stored list of actions, or add-action specifications, and there may be multiple <for-all-in> tags and associated actions for a single tier.

6. DOCUMENT TYPE DEFINITIONS (DTDS)

Table 14 presents XML Document Type Definitions for an embodiment of a symbolic markup language that may be used to create and store one or more textual representations of networked computer systems such as the virtual server farms and data centers described herein.

TABLE 14

MARKUP LANGUAGE DEFINITION

```
<!ELEMENT farm (fw*, lb*, tier*, fixed-server*,
server-role*, device*, subnet*, attribute*)>
<!ATTLIST farm name CDATA #IMPLIED>
<!ATTLIST farm fmlversion CDATA "1.0">
<!ELEMENT fw (out_interface, in_interface, fw_interface*, attribute*)>
<!ATTLIST fw name CDATA #REQUIRED>
<!ATTLIST fw type CDATA #REQUIRED>
<!ELEMENT out_interface (interface, allow?, deny?)>
<!ATTLIST out_interface name CDATA #REQUIRED>
<!ELEMENT in_interface (interface, allow?, deny?)>
<!ATTLIST in_interface name CDATA #REQUIRED>
<!ELEMENT fw_interface (interface, allow?, deny?)>
<!ATTLIST fw_interface name CDATA #REQUIRED>
<!ELEMENT allow (service*))>
<!ELEMENT deny (service*)>
<!ELEMENT service (from+, to+)>
<!ATTLIST service seq CDATA #REQUIRED>
<!ATTLIST service name CDATA #REQUIRED>
<!ATTLIST service protocol CDATA #IMPLIED>
<!ATTLIST service port CDATA #IMPLIED>
<!ELEMENT from EMPTY>
<!ATTLIST from name CDATA (PCDATA)*>
<!ATTLIST from ip CDATA (PCDATA) *>
<!ATTLIST from mask CDATA (PCDATA)*>
<!ELEMENT to EMPTY>
<!ATTLIST to name CDATA (PCDATA)*>
<!ATTLIST to ip CDATA (PCDATA)*>
<!ATTLIST to mask CDATA (PCDATA)*>
<!ELEMENT lb (interface, interface+, policy, vip, attribute*)>
<!ATTLIST lb name CDATA #REQUIRED>
<!ATTLIST lb type CDATA #REQUIRED>
<!ELEMENT policy (PCDATA)*>
<!ELEMENT vip (bind+)>
<!ATTLIST vip name CDATA #REQUIRED>
<!ATTLIST vip subnet CDATA (PCDATA)*>
<!ATTLIST vip ip CDATA (PCDATA)*>
<!ATTLIST vip mask CDATA (PCDATA)*>
<!ATTLIST vip port CDATA (PCDATA)*>
<!ELEMENT bind EMPTY>
<!ATTLIST bind name CDATA #REQUIRED>
<!ATTLIST bind port CDATA (PCDATA)*>
<!ELEMENT tier (interface+, role, add-action?, del-action?, min-servers,
max-servers, init-servers, attribute*)>
<!ATTLIST tier name CDATA #REQUIRED>
<!ELEMENT role (PCDATA)*>
<!ELEMENT add-action (for-all-in, run)>
<!ELEMENT del-action (for-all-in, run)>
<!ELEMENT min-servers (PCDATA)*>
<!ELEMENT max-servers (PCDATA)*>
<!ELEMENT init-servers (PCDATA)*>
<!ELEMENT for-all-in (PCDATA)*>
<!ELEMENT run (name, dir)>
<!ELEMENT name (PCDATA)*>
<!ELEMENT dir (PCDATA)*>
<!ELEMENT fixed-server (interface+, role, attribute*)>
<!ATTLIST fixed-server name CDATA #REQUIRED>
<!ELEMENT device (interface+, attribute*)>
```

TABLE 14-continued

MARKUP LANGUAGE DEFINITION

```
<!ATTLIST device name CDATA #REQUIRED>
<!ATTLIST device type CDATA #REQUIRED>
<!ELEMENT subnet (attribute*)>
<!ATTLIST subnet name CDATA #REQUIRED>
<!ATTLIST subnet mask CDATA #REQUIRED>
<!ATTLIST subnet ip
(internal | external | CDATA) #REQUIRED>
<!ATTLIST subnet vlan CDATA #REQUIRED>
<!--
! The vlan is a duplicate with the subnet definition
! in order to define an interface not associated with
! a particular defined subnet.
-->
<!ELEMENT interface (attribute*)>
<!ATTLIST interface name CDATA #REQUIRED>
<!ATTLIST interface vlan CDATA #IMPLIED>
<!ATTLIST interface ip CDATA #IMPLIED>
<!ATTLIST interface subnet CDATA #IMPLIED>
<!ELEMENT server-role (diskimage, hw, disk*, attribute*)>
<!ATTLIST server-role name CDATA #REQUIRED>
<!ELEMENT diskimage (PCDATA)*>
<!ELEMENT hw (PCDATA)*>
<!ELEMENT disk (attribute)*>
<!ATTLIST disk drivename CDATA #REQUIRED>
<!ATTLIST disk drivesize CDATA #REQU1RED>
<!ATTLIST disk drivetype CDATA #REQUIRED>
```

7. HARDWARE OVERVIEW

Figure 8:
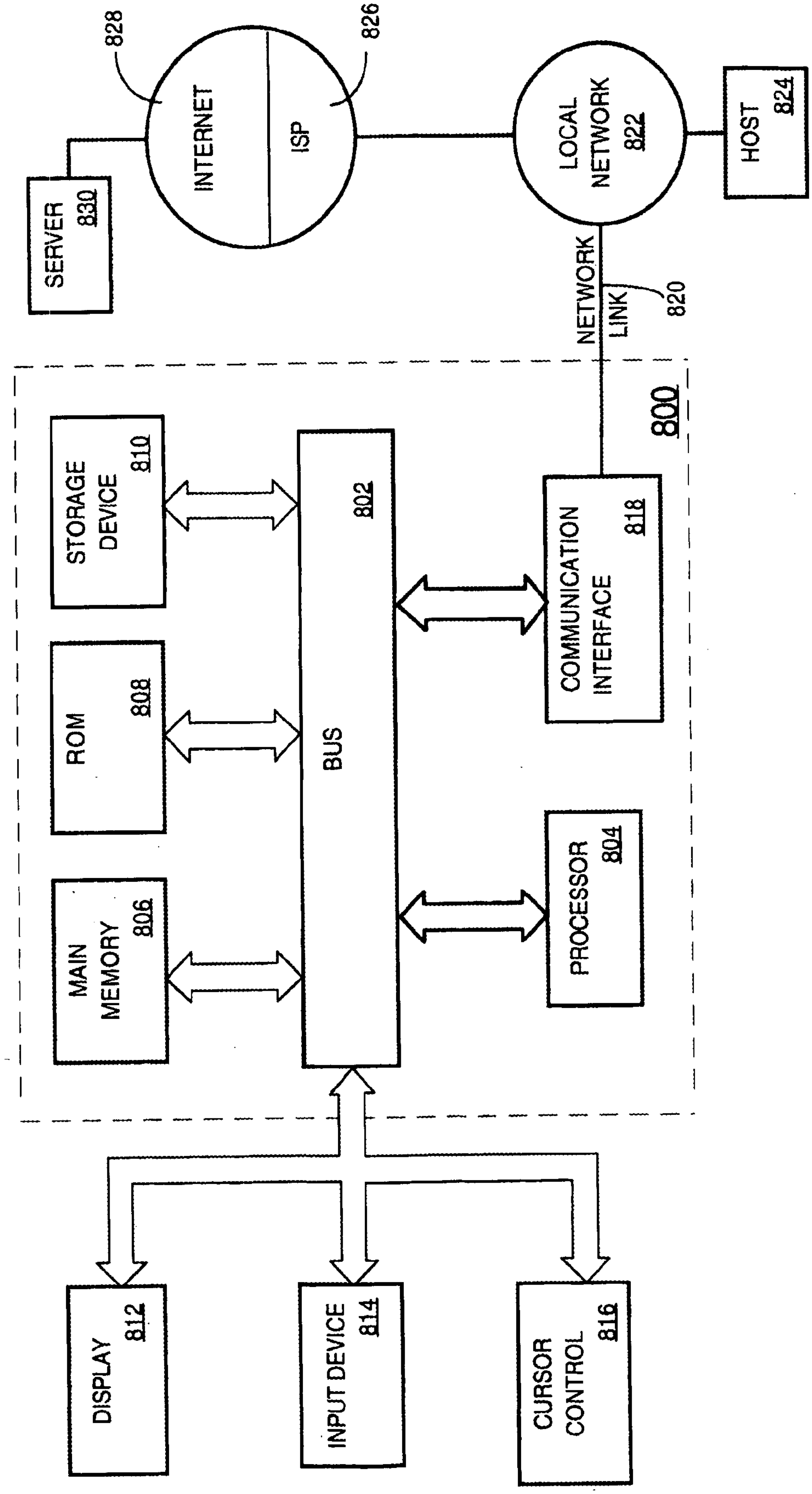
FIG. 8 is a block diagram of a computer system that may be used to implement an embodiment.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device may have two degrees of freedom in a first axis (e.g., x) and a second axis (e.g., y), that allows the device to specify positions in a plane.

The invention is related to the use of computer system 800 for symbolic definition of a computer system. According to one embodiment of the invention, symbolic definition of a computer system is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may be stored on storage device 810.

Computer system 800 also includes a communication interface 818 coupled to bus 802. Communication interface 818 provides a two-way data communication coupling to a network link 820 that is connected to a local network 822. For example, communication interface 818 is an ISDN card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818 are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for symbolic definition of a computer system as described herein. Processor 804 may executed received code as it is received, or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1

The table below describes the attributes for each class, the type, the description and the legal values for each of the attributes, and whether they are configurable when the farm is under design or active.

| Class | Attribute | Type | Description (Label) | Legal Values | Design Configurable | 1.1 Active Configurable |
|---|---|---|---|---|---|---|
| Farm | name | String | Name of this farm (Name) | Any string | Yes | No |
| | nodes | Node[ ] | Set of nodes of this farm | Determined bu GUI | Yes | Yes if the node is non-cloneable; no otherwise |
| | edges | Edge[ ] | Set of edges of this farm | Determined bu GUI | Yes | Yes only if it connects the non-cloneable node to the "Subnet" |
| Node | name | String | Name of this node (Name) | Any unique node name | Yes | No |
| | x | Integer | X-coordinate of this node | Any integer ≧ 0; determined by GUI | Yes | No |
| | y | Integer | Y-coordinate of this node | Any integer ≧ 0; determined by GUI | Yes | No |
| | width | Integer | Width of this node | Any integer > 0 | No | No |
| | height | Integer | Height of this node | Any integer > 0 | No | No |
| | icon | Icon | Icon of this node | System determined based on node's class | No | No |
| | ports | Port[ ] | Set of ports of this node | System determined based on node's class; i.e. "Firewall" has 3 ports, "LoadBalancer" has 2 ports, etc. | No | No |
| Edge | beginNode | Node | Node this edge begins | Determined by GUI | Yes | No |
| | beginPort | Integer | Port of the node this edge begin | Determined by GUI | Yes | No |
| | endNode | Node | Node this edge begins | Determined by GUI | Yes | No |
| | endPort | Integer | Port of the node this edge begin | Determined by GUI | Yes | No |

| Class | Attribute | Type | Description (Level) | Legal Values | Design Configurable | 1.2 Active Configurable |
|---|---|---|---|---|---|---|
| Network | all attributes of Node | | | | | |
| | vlan | String | Name of the VLAN of this network (VLAN) | "vlan0" for "Subnet" and "outer-vlan" for "Internet" | No (for 6/19) | No |
| Internet | all attributes of Network | | | | | |
| Subnet | all attributes of Network | | | | | |
| | mask | String | Mask of this subnet (Subnet Mask) | | No; read only | No |
| | maskLength | Integer | Mask length of this subnet | | No; read only | No |
| Firewall | all attributes of Nodes | | | | | |
| | type | String | Type of this firewall (Type) | "Nokia Checkpoint" (for 6/19) | Yes | No |
| | allowService | Service[ ] | Services allowed by this firewall | | Yes | No |
| | denyServices | Service[ ] | Services denied by this firewall | | Yes | No |
| | dmzServices | Service[ ] | DMZ services allowed by this firewall | | Yes | No |
| Load-Balancer | all attributes of Node | | | | | |
| | type | String | Type of this load balancer (Type) | "Foundry ServerIron"(for 6/19) | Yes | No |
| | vip | String | Virtual IP of this load balancer (Virtual IP) | | No; read only | No |
| | policy | String | Policy of this load balancer (Policy) | ? | Yes | No |
| | balancedNodes | Node[ ] | Nodes balanced by this load balancer (Load Balanced Servers) | Any node connected to the same Subnet | Yes | No (for 6/19) |
| Server | all attributes of Node | | | | | |

-continued

| Class | Attribute | Type | Description (Label) | Legal Values | Design Configurable | 1.3 Active Configurable |
|---|---|---|---|---|---|---|
| | role | String | Role of this tier (Software Image) | See table in Section 3 | Yes | No |
| | hardware | String | Hardware used in this server (Hardware) | See table in Section 3 | Yes but constrained by role | No |
| | isExternal | Boolean | Whether this server is internal or external (Automatically Assign IP Address) | true or false | Yes | No |
| | isCloneable | Boolean | Whether this server is cloneable | true or false; See table in Section 3 | No; determined based on role | No (always) |
| Server (cont') | minClone | Integer | Max. no. of clones allowed by this tier (?) | Any integer > 0 | Yes only if configurable | Yes only if configurable |
| | maxClone | Integer | Max. no. of clones allowed by this tier (?) | Any integer ≧ minClone | Yes only if configurable | Yes only if configurable |
| | initClone | Integer | Initial no. of clones specified by the user (?) | Any integer ≧ minClone and ≦ maxClone | Yes only if configurable | Yes only if configurable |
| | disks | Disk[ ] | Set of disks of this server | | Yes | No |
| Disk | name | String | Drive name of this disk (Drive) | Any unique disk name | No | No |
| | size | Integer | Size of this disk (in GB) (Size) | Any integer > 0 | Yes | Yes |
| | raidLevel | String | Raid level of this disk (Raid Level) | ? | Yes | Yes? |
| | hasMirror | Boolean | Whether this disk has a mirror (Mirrored) | true or false | Yes | Yes? |
| | backupPolicy | String | Backup policy of this disk | ? | Yes | Yes? |
| Service | name | String | Name of this service | Any unique service name | Yes | No |
| | protocol | String | Protocol of this service | ? | Yes | No |
| | port | String | Port of this service | Any integer ≧ 0 | Yes | No |
| | whos | Who[ ] | IPs of this service | | Yes | No |
| Port | x | Integer | X-coordinate of this port | Any integer ≧ 0 | Yes; derived from GUI | No |
| | y | Integer | Y-coordinate of this port | Any integer ≧ 0 | Yes; derived from GUI | No |
| | direction | String | Direction of this port | "in" or "out" | No | No |
| Interface | all attributes of Port | | | | | |
| | name | String | Name of this interface | Any unique port name of the node | Yes | No |
| | logicalName | String | DNS name of this surface | Valid DNS name | Yes | No |
| | ip | String | IP address if this address (IP Address) | | No; read only | No |
| Who | ipMask | String | IP mask of this network | Any valid mask value | Yes | No |
| | maskLength | Integer | Mask length of this network | ? | Yes | No |
| Icon | location | String | Path to the file containing this icon | Valid path to an image file | No; same for all users | No |
| | width | Integer | Width of this icon | Any integer > 0 | No; same for all users | No |
| | height | Integer | Height of this icon | Any integer > 0 | No; same for all users | No |
| Monitor | TBD | | | | | |

What is claimed is:

1. A method of defining and deploying a networked computer system, comprising the steps of:

creating and storing a textual representation of a logical configuration of the networked computer system, wherein the textual representation conforms to a structured markup language;

based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

2. A method as recited in claim 1, wherein creating and storing a textual representation comprises the steps of creating and storing a textual representation of a logical configuration of the networked computer system, wherein the textual representation conforms to a structured markup language, wherein the textual representation includes at least one element defining an automatically created monitor process for monitoring one or more parameters of one or more of the computing elements.

3. A method as recited in claim 1, wherein creating and storing a textual representation comprises the steps of creating and storing a textual representation of a logical configuration of the networked computer system, wherein the textual representation conforms to a structured markup language, wherein the textual representation includes at least one element defining a load balancing function for one or more of the computing elements.

4. A method as recited in claim 1, wherein the textual representation comprises:

at least one server role definition comprising at least a role name value and a hardware type value; and one or more definitions of servers of the networked computer system, wherein each definition of a server uses and references the server role definition.

5. A method as recited in claim 1, wherein the textual representation comprises:

at least one server role definition comprising at least a role name value and a hardware type value; and a plurality of definitions of servers in a server tier of the networked computer system, wherein each definition of a server uses and references the server role definition.

6. A method as recited in claim 1, wherein the textual representation comprises:

at least one definition of a load balancing function;

at least one server tier definition that defines a plurality of servers that receive inbound traffic from the load balancing function; and at least one fixed server definition that defines a fixed server that is associated with a server role definition.

7. A method as recited in claim 6, wherein the definition of the load balancing function comprises an indication that inbound traffic directed to the load balancing function arrives from an outer virtual local area network.

8. A method as recited in claim 6, further comprising the steps of:

receiving server selection information representing addition of a new server to the logical configuration of the networked computer system;

in response thereto, automatically generating and sending to a load balancer that carries out the load balancing function, configuration information that identifies the new server and that instructs the load balancer to begin carrying out load balancing for the new server.

9. A method as recited in claim 8, wherein the configuration information comprises an IP address of a subnet that contains the new server.

10. A method as recited in claim 1, wherein the textual representation comprises:

at least one server tier definition that defines a plurality of servers that receive inbound traffic from a load balancing function; and at least one definition of the load balancing function, comprising an output interface value, an input interface value, a virtual address value, a load balancing policy value, and a tier value that identifies the server tier to which traffic is directed using the load balancing function.

11. A method as recited in claim 6, further comprising the steps of:

receiving server selection information representing addition of a new server to the logical configuration of the networked computer system;

in response thereto, automatically generating and sending to a DNS server and a DHCP server of a subnet that contains the new server, address information that identifies the new server and that instructs the DNS server and DHCP server to begin providing services to the new server.

12. A method as recited in claim 1, wherein the textual representation comprises at least one server tier definition that defines a plurality of servers that receive inbound traffic from the load balancing function; and wherein each server tier definition comprises one or more input interface values, a role value, and information specifying a maximum number of physical servers and a minimum number of physical servers for use in a server tier represented by the server tier definition.

13. A method as recited in claim 1, wherein the textual representation comprises at least one fixed server definition that defines a statically addressed server of the networked computer system; and wherein each server definition comprises one or more input interface values that identify a virtual local area network, a role value that identifies a processing role carried out by the server, and information specifying a network address of the server.

14. A method as recited in claim 1, further comprising the steps of:

associating a first server definition of the textual representation with at least one external entity declaration that represents a network address of a server that is represented by the first server definition;

creating and storing, in the textual representation, a copied server definition based on duplicating the first server definition;

resolving each external entity declaration of the server definition of the textual representation and the copied server definition of the textual representation into a different actual network address;

based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

15. A method as recited in claim 1, further comprising the steps of:

receiving a first server definition that omits a network address of a server that is represented by the first server definition;

creating and storing, in the textual representation, a copied server definition based on duplicating the first server definition that is associated with the graphical icon;

determining a dynamic network address value for use with the server that is represented by the first server definition;

based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

16. A method as recited in claim 1, wherein the textual representation comprises at least one firewall definition that comprises a firewall name value, a plurality of interface values that define logical connections to a firewall device associated with the firewall definition, and one or more definitions of services that the firewall is allowed to permit or deny.

17. A method as recited in claim 1, wherein the textual representation comprises:

at least one server role definition comprising at least a role name value and a hardware type value;

a disk attribute definition that defines additional local disk storage for the server defined in the server role definition, comprising a drive name value and a drive size value; and one or more definitions of servers of the networked computer system, wherein each definition of a server uses and references the server role definition.

18. A method as recited in claim 15, wherein the step of generating one or more commands comprises the steps of:

generating one or more commands that allocate disk space according to the drive size value in a storage device that is accessible using a storage area network interface;

mapping the allocated disk space to a server of the networked computer system that implements one of the definitions of servers.

19. A method as recited in claim 15, wherein the step of generating one or more commands comprises the steps of:

providing in the textual representation, one or more disk tags that specify one or more changes in storage volume for the logical configuration;

generating one or more commands that create one or more logical volumes of disk space according to the drive size value in a storage device that is accessible using a storage area network interface;

mapping the allocated disk space to a server of the networked computer system that implements one of the definitions of servers.

20. A method as recited in claim 1, wherein the textual representation comprises an action definition that defines actions for execution for each server in a tier of one or more servers when an additional server is added to the tier.

21. A method as recited in claim 20, wherein the action definition comprises one or more tier name values, wherein each tier name value identifies the tier and has an associated script name value that identifies a script of actions for execution with respect to each server in the tier identified by the name value.

22. A method as recited in claim 21, further comprising the steps of:

receiving information indicating that a new server has been added to the tier;

executing the script of actions with respect to each server in the tier.

23. A method as recited in claim 1, wherein the textual representation comprises one or more definitions of repeatable actions, wherein each definition of a repeatable action defines one or more actions for execution with respect to each server in a tier of one or more servers when an additional server is added to the tier.

24. A method as recited in claim 20, wherein the action definition comprises a tier name value that identifies the tier, and a script name value that identifies a script of actions for execution with respect to each server in the tier identified by the name value, and further comprising the steps of receiving a network address of a new server that is newly added to the tier and invoking the script on the new server based on the network address of the new server.

25. A method as recited in claim 20, wherein the textual representation comprises a second action definition that defines second actions for execution for each server in a tier of one or more servers when one of the servers is removed from the tier.

26. A method as recited in claim 25, wherein the action definition comprises a tier name value that identifies the tier, and a script name value that identifies a script of actions for execution with respect to each server in the tier identified by the name value.

27. A method as recited in claim 25, further comprising the steps of:

receiving information indicating that one of the servers has been deleted from the tier;

executing the script of actions with respect to each server in the tier.

28. A method as recited in claim 1, wherein the textual representation comprises an action definition that defines actions for execution for each server in a first tier of one or more servers when an additional server is added to a second tier of one or more servers.

29. A method as recited in claim 28, wherein the action definition comprises one or more tier name values, wherein each tier name value identifies the first tier and has an associated script name value that identifies a script of actions for execution with respect to each server in the first tier.

30. A method as recited in claim 29, further comprising the steps of:

receiving information indicating that a new server has been added to the second tier, executing the script of actions with respect to each server in the first tier.

31. A method as recited in claim 1, wherein the textual representation comprises one or more definitions of repeatable actions, wherein each definition of a repeatable action defines one or more actions for execution with respect to each server in a first tier of one or more servers when an additional server is added to a second tier of one or more servers.

32. A method as recited in claim 31, wherein the action definition comprises a tier name value that identifies the first tier, and a script name value that identifies a script of actions for execution with respect to each server in the first tier, and further comprising the steps of receiving a network address of a new server that is newly added to the second tier and invoking the script on the new server based on the network address of the new server.

33. A method as recited in claim 1, wherein the textual representation comprises an action definition that defines actions for execution for each server in a first tier of one or more servers when one of the servers is removed from a second tier of one or more servers.

34. A method as recited in claim 33, wherein the action definition comprises a tier name value that identifies the first tier, and a script name value that identifies a script of actions for execution with respect to each server in the first tier.

35. A method as recited in claim 34, further comprising the steps of:

receiving information indicating that one of the servers has been deleted from the first tier;

executing the script of actions with respect to each server in the second tier.

36. A method as recited in claim 1, further comprising the steps of:

receiving a storage definition in the textual representation that specifies a requested quantity of storage for association with the computer system that is defined in the textual representation;

based on a stored table that maps logical units of storage available for use in the computer system, requesting and obtaining an assignment of the storage to the computer system;

automatically creating and storing a mapping that correlates the assigned storage to a processing unit of the computer system.

37. A method as recited in claim 1, further comprising the steps of:

receiving a storage definition in the textual representation that specifies a requested quantity of storage for association with the computer system that is defined in the textual representation;

based on a stored table that maps logical units of storage available for use in the computer system, requesting and obtaining an assignment of the storage to the computer system;

providing to a gateway that interfaces the assigned storage to a processing unit of the computer system, a mapping of the assigned storage to a port of the gateway.

38. A tangible computer-readable medium carrying one or more sequences of instructions for defining and deploying a networked computer system, wherein execution of the one or more sequences of instructions by one or more processors causes the one or more processors to perform the steps of:

creating and storing a textual representation of a logical configuration of the networked computer system, wherein the textual representation conforms to a structured markup language;

based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

39. An apparatus for defining and deploying a networked computer system, comprising:

means for creating and storing a textual representation of a logical configuration of the networked computer system, wherein the textual representation conforms to a structured markup language;

means for based on the textual representation, generating one or more commands for one or more switch devices that are interconnected to one or more computing elements and storage devices, wherein the commands instruct the switch devices to logically connect the computing elements and storage devices into an operable computer system that conforms to the logical configuration.

40. An apparatus for defining and deploying a networked computer system, comprising:

a processor;

a computer-readable memory accessible to the processor and storing a textual representation of a logical configuration of the networked computer system, wherein the textual representation conforms to a structured markup language;

one or more sequences of instructions stored in the computer-readable memory and which, when executed by the processor, cause the processor to generate one or more commands for one or more switch devices that are interconnected to one or more computing elements and storage devices, based on the textual representation, wherein the commands instruct the switch devices to logically connect the computing elements and storage devices into an operable computer system that conforms to the logical configuration.

* * * * *